US011233536B2

(12) United States Patent
Alam et al.

(10) Patent No.: US 11,233,536 B2
(45) Date of Patent: Jan. 25, 2022

(54) HIGH-PERFORMANCE RECEIVER ARCHITECTURE

(71) Applicant: Intel Corporation, Santa Clara, CA (US)

(72) Inventors: Mohammed Alam, Chandler, AZ (US); Yiwen Chen, Chandler, AZ (US); Ricardo Fernandez, Scottsdale, AZ (US); John J. Parkes, Jr., Chandler, AZ (US); James Riches, Chandler, AZ (US); Werner Schelmbauer, Steyr (AT); Daniel Schwartz, Scottsdale, AZ (US); Michael David Vicker, Chandler, AZ (US); Dong-Jun Yang, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/956,738

(22) PCT Filed: Mar. 28, 2018

(86) PCT No.: PCT/US2018/024845
§ 371 (c)(1),
(2) Date: Jun. 22, 2020

(87) PCT Pub. No.: WO2019/190500
PCT Pub. Date: Oct. 3, 2019

(65) Prior Publication Data
US 2020/0321994 A1 Oct. 8, 2020

(51) Int. Cl.
*H04B 1/26* (2006.01)
*H04B 1/18* (2006.01)
(Continued)

(52) U.S. Cl.
CPC ................ *H04B 1/26* (2013.01); *H04B 1/18* (2013.01); *H04B 7/0413* (2013.01);
(Continued)

(58) Field of Classification Search
CPC .... H04B 1/0028; H04B 1/0035; H04B 1/005; H04B 1/0064; H04B 1/0067;
(Continued)

(56) References Cited

U.S. PATENT DOCUMENTS 6,157,822 A * 12/2000 Bastani ................ H03D 7/1433
455/292
2008/0084951 A1 4/2008 Chen et al.
(Continued)

FOREIGN PATENT DOCUMENTS

WO WO-2007038310 A1 4/2007

OTHER PUBLICATIONS

"International Application Serial No. PCT/US2018/024845, International Search Report dated Jan. 2, 2019", 3 pgs.
(Continued)

*Primary Examiner* — Young T. Tse
(74) *Attorney, Agent, or Firm* — Schwegman Lundberg & Woessner, P.A,

(57) ABSTRACT

A wireless communication device can include an antenna array configured to receive a plurality of radio frequency (RF) signals, RF circuitry, and digital baseband receive circuitry. The RF circuitry is configured to process the plurality of RF signals received via the antenna array to generate a single RF signal. The digital baseband receive circuitry is coupled to the RF circuitry and is configured to generate a downconverted signal based on the single RF signal, amplify the downconverted signal to generate an amplified downconverted signal, and convert the amplified downconverted signal to generate a digital output signal for
(Continued)

processing by a wireless modem. The digital baseband receive circuitry further includes at least a first filtering system configured to filter the downconverted signal prior to amplification.

24 Claims, 23 Drawing Sheets

(51) Int. Cl.
  *H04B 7/0413* (2017.01)
  *H04B 7/08* (2006.01)
  *H04L 25/02* (2006.01)
(52) U.S. Cl.
  CPC ....... *H04B 7/0837* (2013.01); *H04L 25/0272* (2013.01); *H04L 25/0292* (2013.01)
(58) Field of Classification Search
  CPC .......... H04B 1/0082; H04B 1/18; H04B 1/26; H04B 1/38; H04B 1/40; H04B 7/04; H04B 7/0413; H04B 7/0837; H04L 25/026; H04L 25/0272; H04L 25/0292
  USPC ....... 375/219, 220, 222, 260–262, 265, 267, 375/316, 347, 349, 350; 370/277, 278, 370/282, 310, 343, 345; 455/500, 88, 455/553.1, 132
  See application file for complete search history.

(56) References Cited

U.S. PATENT DOCUMENTS

| | | |
|---|---|---|
| 2010/0323651 A1 | 12/2010 | Ranjan |
| 2011/0110467 A1 | 5/2011 | Maltsev et al. |
| 2011/0244820 A1* | 10/2011 | Khoini-Poorfard .... H03H 11/04 455/255 |
| 2014/0043104 A1* | 2/2014 | Chen .......................... G06F 1/10 331/46 |
| 2015/0200690 A1* | 7/2015 | Youssef ................. H04B 1/005 455/73 |
| 2015/0318976 A1* | 11/2015 | Eltawil .................. H04B 1/123 370/278 |
| 2016/0126894 A1* | 5/2016 | Lakdawala ............ H03D 7/165 455/326 |
| 2016/0285567 A1* | 9/2016 | Alam ................... H03D 7/1466 |

OTHER PUBLICATIONS

"International Application Serial No. PCT/US2018/024845, Written Opinion dated Jan. 2, 2019", 10 pgs.

"International Application Serial No. PCT US2018 024845, International Preliminary Report on Patentability dated Oct. 8, 2020", 12 pgs.

"International Application Serial No. PCT US2018 024845, International Preliminary Report on Patentability dated Oct. 14, 2021", 12 pgs.

* cited by examiner

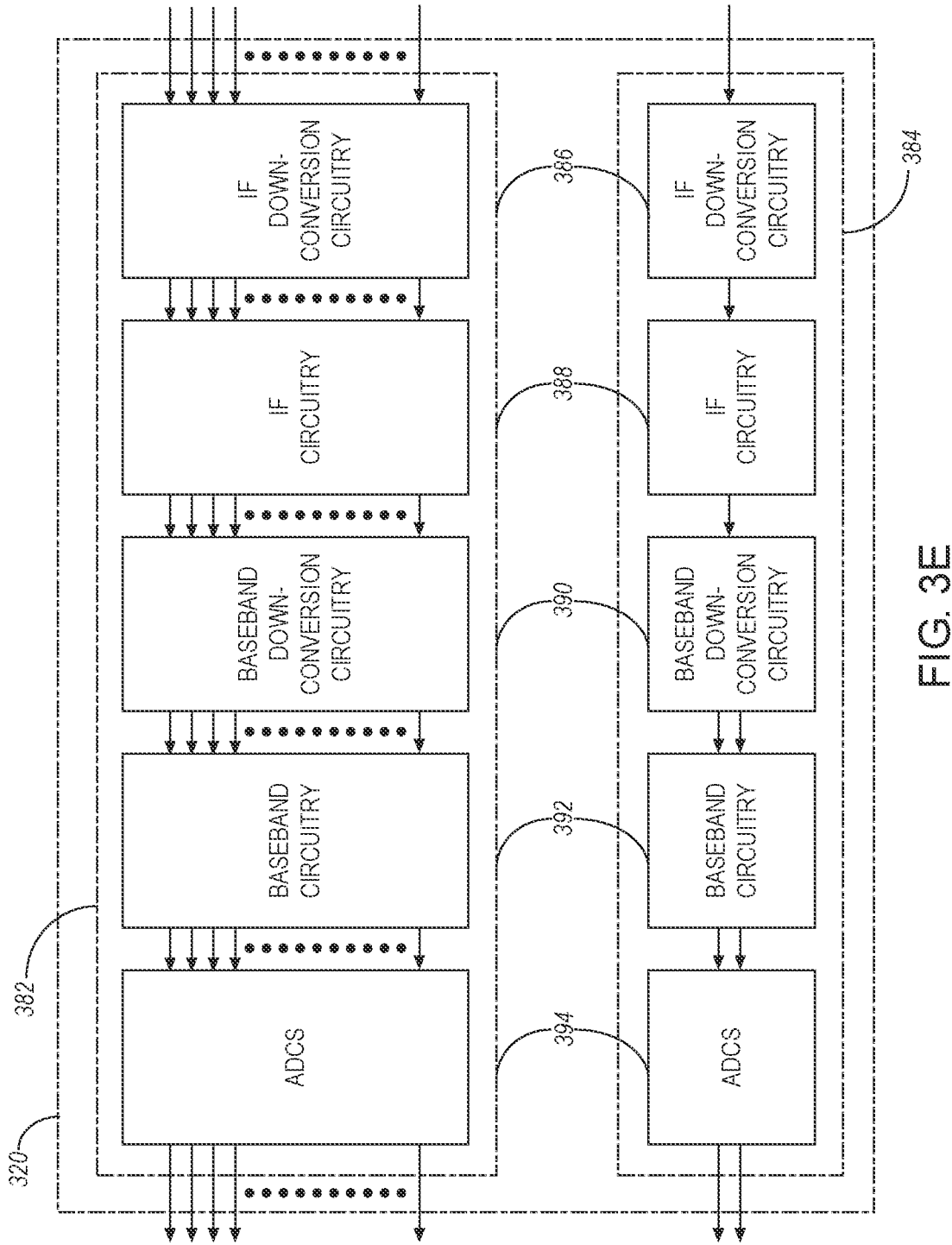

FIG. 15

HIGH-PERFORMANCE RECEIVER ARCHITECTURE

This patent application is a U.S. National Stage Filing under 35 U.S.C. 371 from International Application No. PCT/US2018/024845, filed Mar. 28, 2018 and published in English as WO 2019/190500 on Oct. 3, 2019, which is hereby incorporated by reference herein in its entirety.

TECHNICAL FIELD

Aspects pertain to wireless signal processing techniques. Some aspects relate to a high-performance receiver architecture. Some aspects relate to 4×4 Multiple-Input-Multiple-Output (MIMO) operation in wireless transceivers. Some aspects relate to controlling filtering poles at an output of a mixer and, more specifically, minimizing filtering pole variation and peak shift variation.

BACKGROUND

The ubiquity of wireless communication has continued to raise a host of challenging issues. In particular, challenges have evolved with the advent of mobile communication systems, such as 5G communications systems due to both the wide variety of devices with different needs and the spectrum to be used. In particular, the ranges of frequency bands used in communications have increased, most recently due to the incorporation of carrier aggregation of licensed and unlicensed bands and the upcoming use of the mmWave bands.

MIMO communication devices are beginning to become practical consumer products. However, challenges remain with how to efficiently configure the devices while at the same time minimize cross-talk interference, reduce current drain, reduce mixer supply/ground noise, and further increase device performance.

BRIEF DESCRIPTION OF THE DRAWINGS

In the drawings, which are not necessarily drawn to scale, like numerals may describe similar components in different views. Like numerals having different letter suffixes may represent different instances of similar components. Some aspects are illustrated by way of example, and not limitation, in the figures of the accompanying drawings in which:

FIG. 3E illustrates aspects of exemplary receive circuitry in FIG. 3A according to some aspects.

Figure 15:
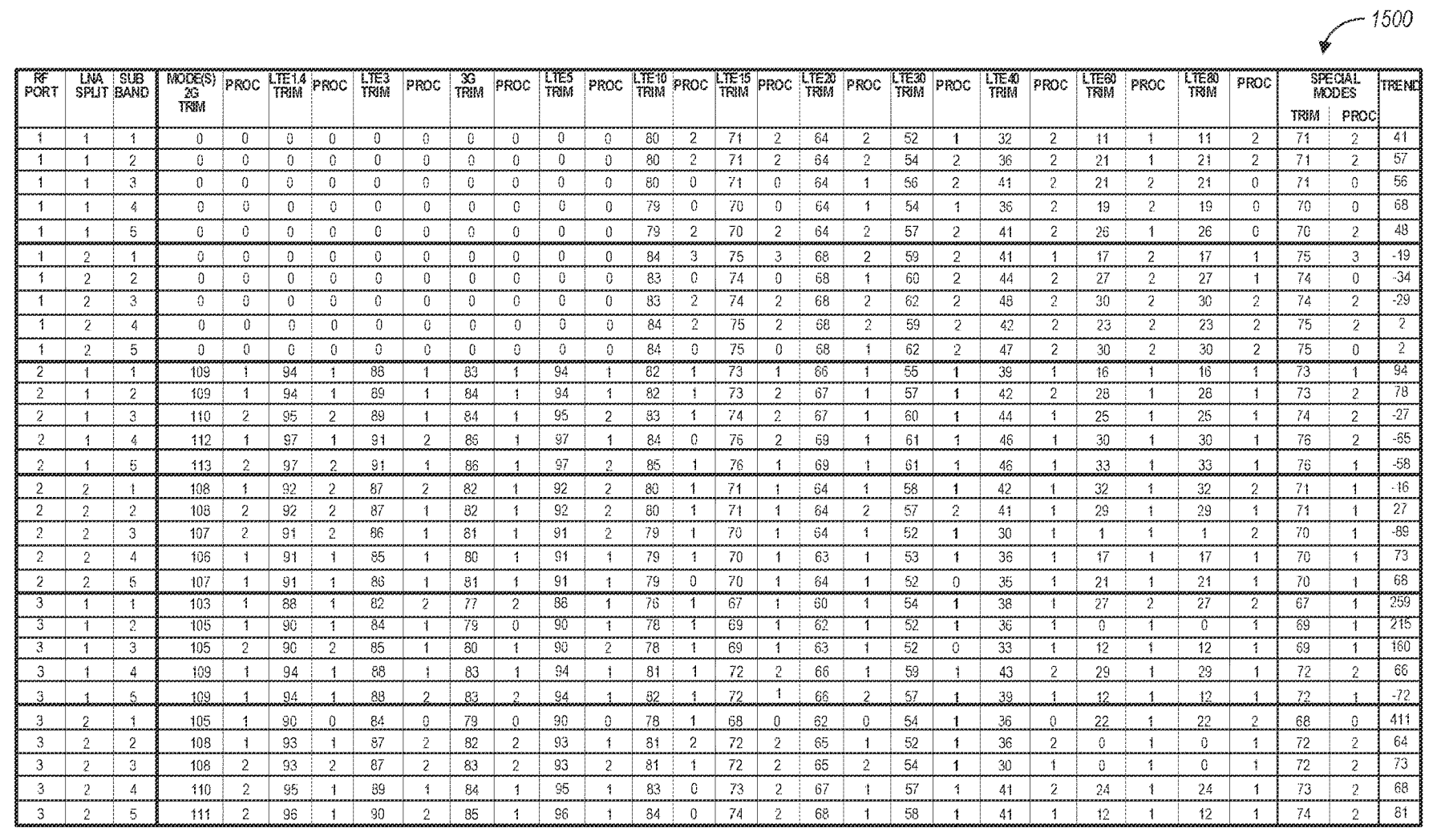

FIG. 15 illustrates an example firmware table which can be used to configure the filtering poles of FIG. 14, according to some aspects.

DETAILED DESCRIPTION

Figure 1:
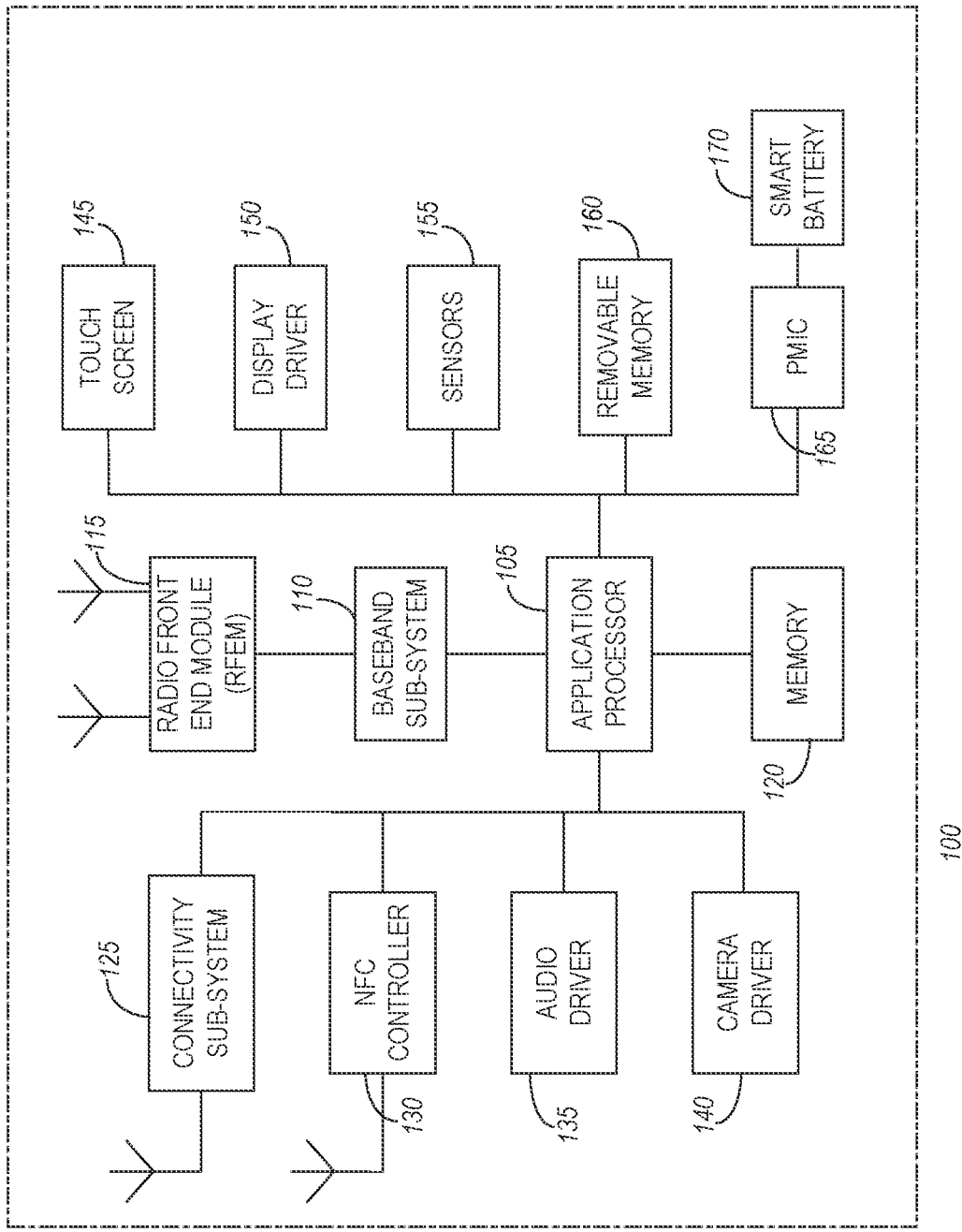
FIG. 1 illustrates an exemplary user device according to some aspects.

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

With the advancement of wireless communications, such as 3G, 4G and 5G communications, several challenges have evolved in the wireless transceiver design, such as insufficient analog-to-digital converter (ADC) selectivity, cross-talk interference mitigation, supply/ground noise mitigation in connection with single-balance mixers, using separate phased locked loops (PLLs) (or quadgens) for main and diversity signal paths, increase in processing path resources in 4×4 MIMO transceiver solutions, and so forth. Techniques disclosed herein can be used to address these challenges. More specifically, techniques disclosed herein can include providing multiple filtering poles before the ADC circuit in a transceiver architecture (e.g., one filtering pole before a pseudo double-balanced mixer and one filtering pole before the ADC input), routing RF transmission lines to the mixer instead of routing the local oscillator (LO) signal, translational filtering for duplex blockers at the mixer input, using the same PLL/quadgen for main signal and diversity signal baseband processing paths, reusing existing main/diversity baseband signal processing paths for 4×4 MIMO operation, using a fixed output stage at the output of the low-noise amplifier (LNA) to provide constant impedance for the mixer filtering pole, and so forth.

Discussions herein utilizing terms such as, for example, "processing" "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "an example aspect", "some aspects", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may, for example, be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016); IEEE802.11ay (P802.11ay Standard for information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative aspects may be used in conjunction with a wireless communication network communicating over a frequency band above 45 Gigahertz (GHz), e.g., 60 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a frequency band above 45 GHz, a frequency band below 20 GHz, e.g., a Sub 1 GHz (SIG) band, a 2.4 GHz band, a 5 GHz band, a WLAN frequency band, a WPAN frequency band, a frequency band according to the WGA specification, and the like.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna" or "antenna array", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

FIG. 1 illustrates an exemplary user device according to some aspects. The user device 100 may be a mobile device in some aspects and includes an application processor 105, baseband processor 110 (also referred to as a baseband sub-system), radio front end module (RFEM) 115, memory 120, connectivity sub-system 125, near field communication (NEC) controller 130, audio driver 135, camera driver 140, touch screen 145, display driver 150, sensors 155, removable memory 160, power management integrated circuit (PMIC) 165, and smart battery 170.

In some aspects, the application processor 105 may include, for example, one or more central processing unit (CPU) cores and one or more of cache memory, low drop-out voltage regulators (LDOs), interrupt controllers, serial interfaces such as SPI, I2C, or universal programmable serial interface sub-system, real-time clock (RTC), timer-counters including interval and watchdog timers, general-purpose IO, memory card controllers such as SD/MMC or similar, USB interfaces, MIPI interfaces, and/or Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module including two or more integrated circuits.

Applications of mmWave technology can include, for example, WiGig and future 5G, but the mmWave technology can be applicable to a variety of telecommunications systems. The mmWave technology can be especially attractive for short-range telecommunications systems. WiGig devices operate in the unlicensed 60 GHz band, whereas 5G mmWave is expected to operate initially in the licensed 28 GHz and 39 GHz bands. A block diagram of an example baseband sub-system 110 and RFEM 115 in a mmWave system is shown in FIG. 1A.

Figure 1A:
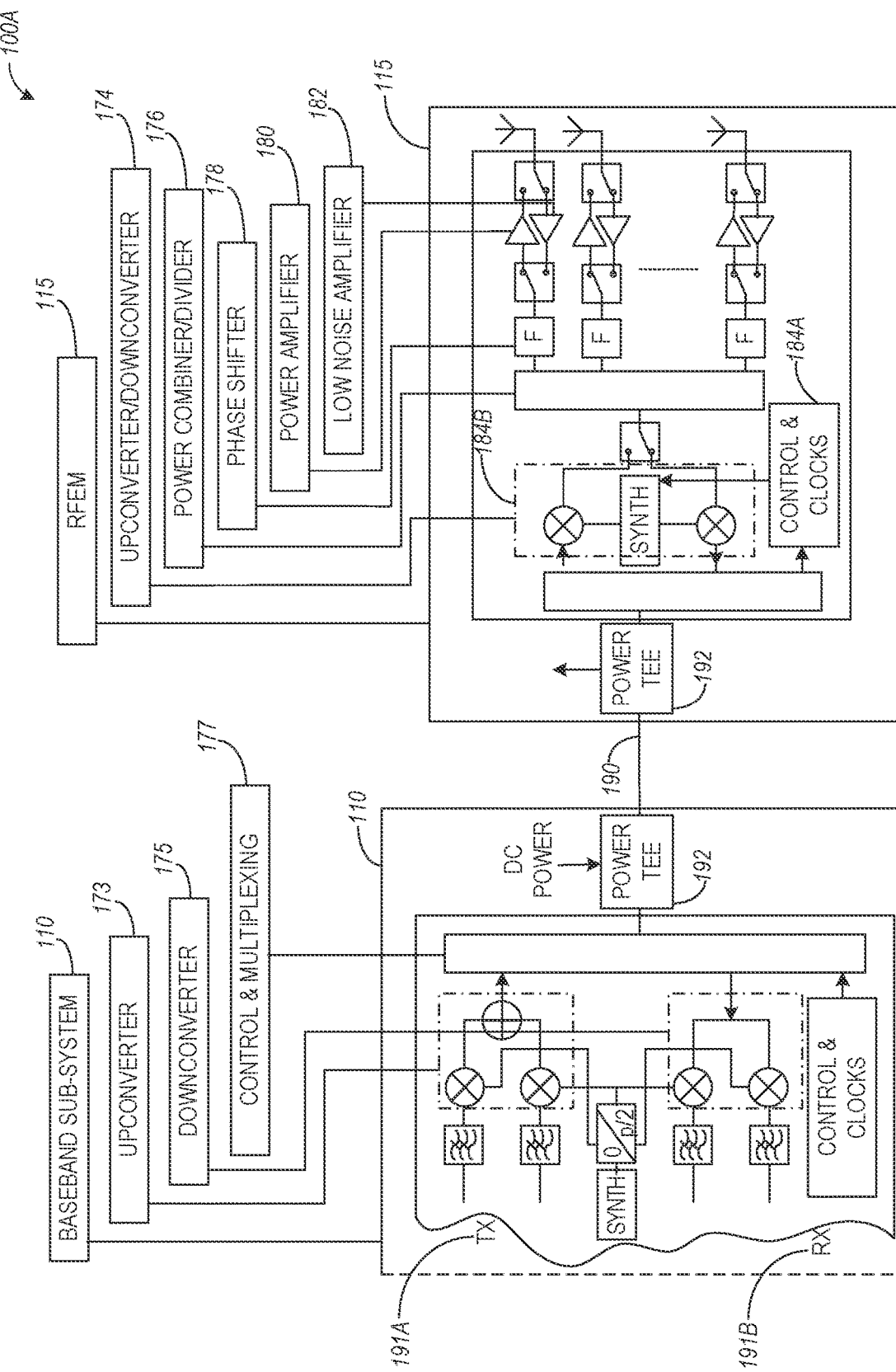
FIG. 1A illustrates a mmWave system, which can be used in connection with the device of FIG. 1 according to some aspects.

FIG. 1A illustrates a mmWave system 100A, which can be used in connection with the user device 100 of FIG. 1 according to some aspects of the present disclosure. The mmWave system 100A includes two components: a baseband sub-system 110 and one or more radio front end modules (RFEMs) 115. The RFEM 115 can be connected to the baseband processor 110 by a single cable 190, such as a coaxial cable, which supplies a modulated intermediate frequency (IF) signal, DC power, clocking signals and control signals.

The baseband sub-system 110 is not shown in its entirety, but FIG. 1A rather shows an implementation of analog front end. This includes a transmitter (TX) section 191A with an upconverter 173 to intermediate frequency (IF) (around 10 GHz in current implementations), a receiver (RX) section 191B with downconversion 175 from IF to baseband, control and multiplexing circuitry 177 including a combiner to multiplex/demultiplex transmit and receive signals onto a single cable 190. In addition, power tee circuitry 192 (which includes discrete components) is included on the baseband circuit board to provide DC power for the RFEM 115. In some aspects, the combination of the TX section and RX section may be referred to as a transceiver, to which may be coupled one or more antennas or antenna arrays of the types described herein.

The RFEM 115 can be a small circuit board including a number of printed antennas and one or more RF devices containing multiple radio chains, including upconversion/downconversion 174 to millimeter wave frequencies, power combiner/divider 176, programmable phase shifting 178 and power amplifiers (PA) 180, low noise amplifiers (LNA) 182, as well as control and power management circuitry 184A and 184B. This arrangement can be different from Wi-Fi or cellular implementations, which generally have all RF and baseband functionality integrated into a single unit and only antennas connected remotely via coaxial cables.

This architectural difference can be driven by the very large power losses in coaxial cables at millimeter wave frequencies. These power losses can reduce the transmit power at the antenna and reduce receive sensitivity. In order to avoid this issue, in some aspects, PAs 180 and LNAs 182 may be moved to the RFEM 115 with integrated antennas. In addition, the RFEM 115 may include upconversion/downconversion 174 so that the IF signals over the coaxial cable 190 can be at a lower frequency. Additional system context for mmWave 5G apparatuses, techniques and features is discussed herein below.

Figure 2:
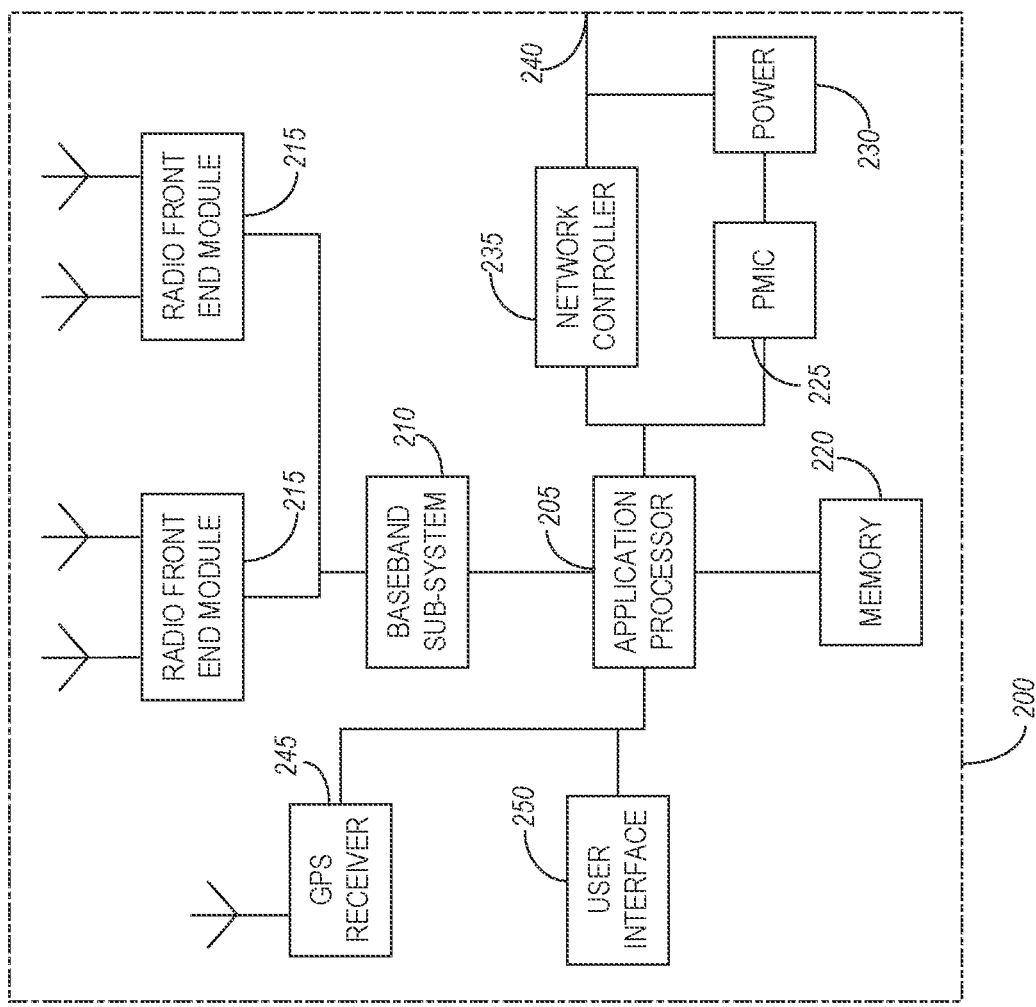
FIG. 2 illustrates an exemplary base station radio head according to some aspects.

FIG. 2 illustrates an exemplary base station or infrastructure equipment radio head according to some aspects. The base station radio head 200 may include one or more of application processor 205, baseband processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I2C or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magnetoresistive random access memory (MRAM), and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable. Power tee circuitry 230 may provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, the satellite navigation receiver 245 may include circuitry to receive and decode signals transmitted by one or more navigation satellite constellations such as the global positioning system (GPS), Globalnaya. Navigatsionnaya Sputnikovaya Sistema (GLONASS), Galileo and/or BeiDou. The satellite navigation receiver 245 may provide, to application processor 205, data which may include one or more of position data or time data. Time data may be used by application processor 205 to synchronize operations with other radio base stations or infrastructure equipment.

In some aspects, user interface 250 may include one or more of buttons. The buttons may include a reset button. User interface 250 may also include one or more indicators such as LEDs and a display screen.

Figure 3A:
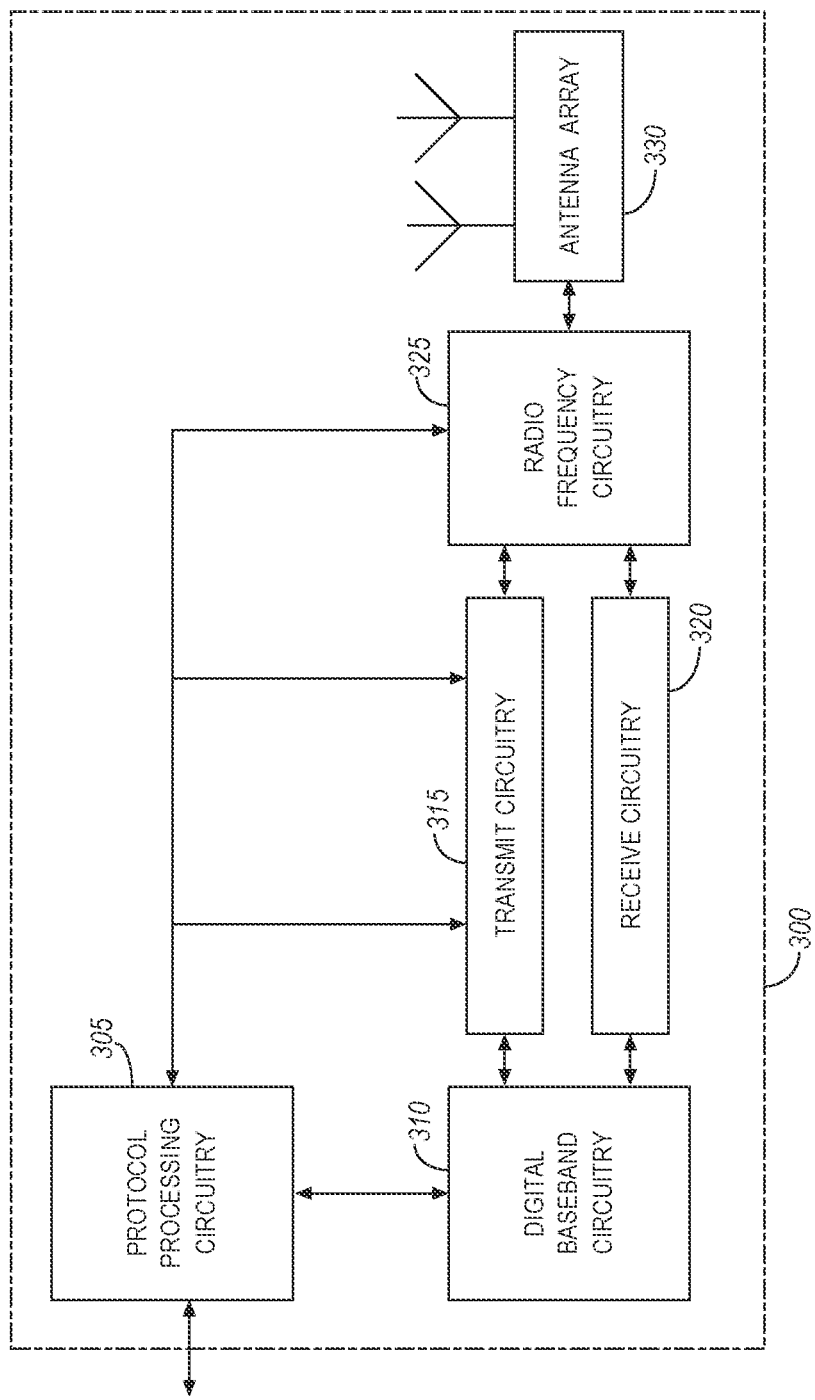
FIG. 3A illustrates exemplary wireless communication circuitry according to some aspects.
Figure 3B:
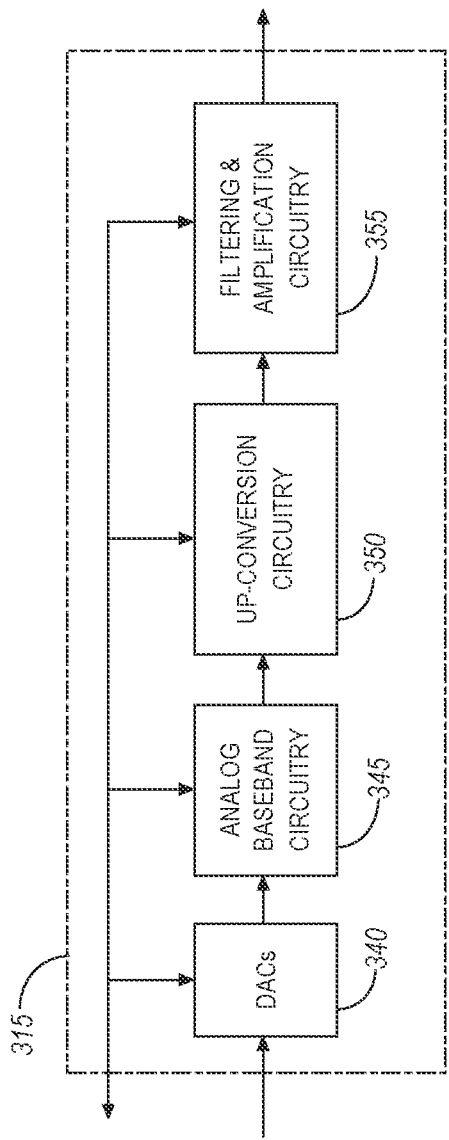
FIG. 3B illustrates aspects of exemplary transmit circuitry illustrated in FIG. 3A according to some aspects.
Figure 3C:
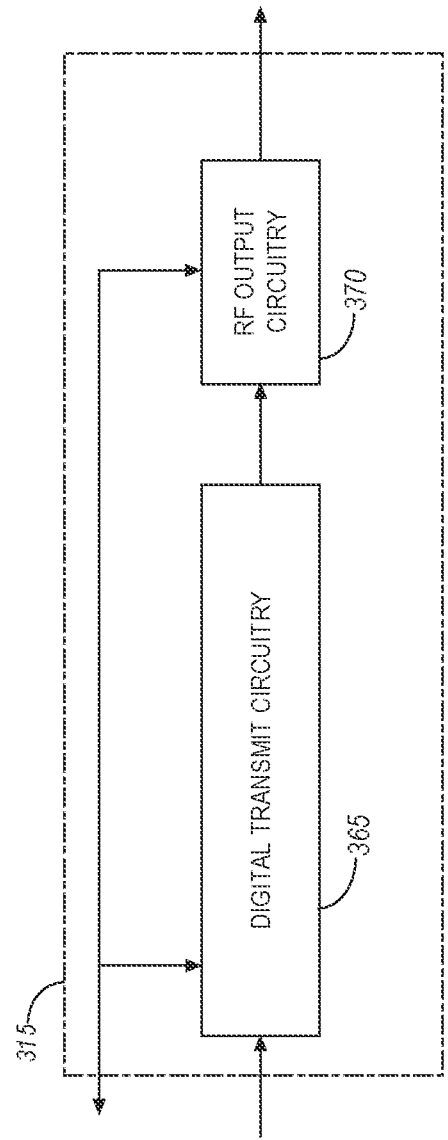
FIG. 3C illustrates aspects of exemplary transmit circuitry illustrated in FIG. 3A according to some aspects.
Figure 3D:
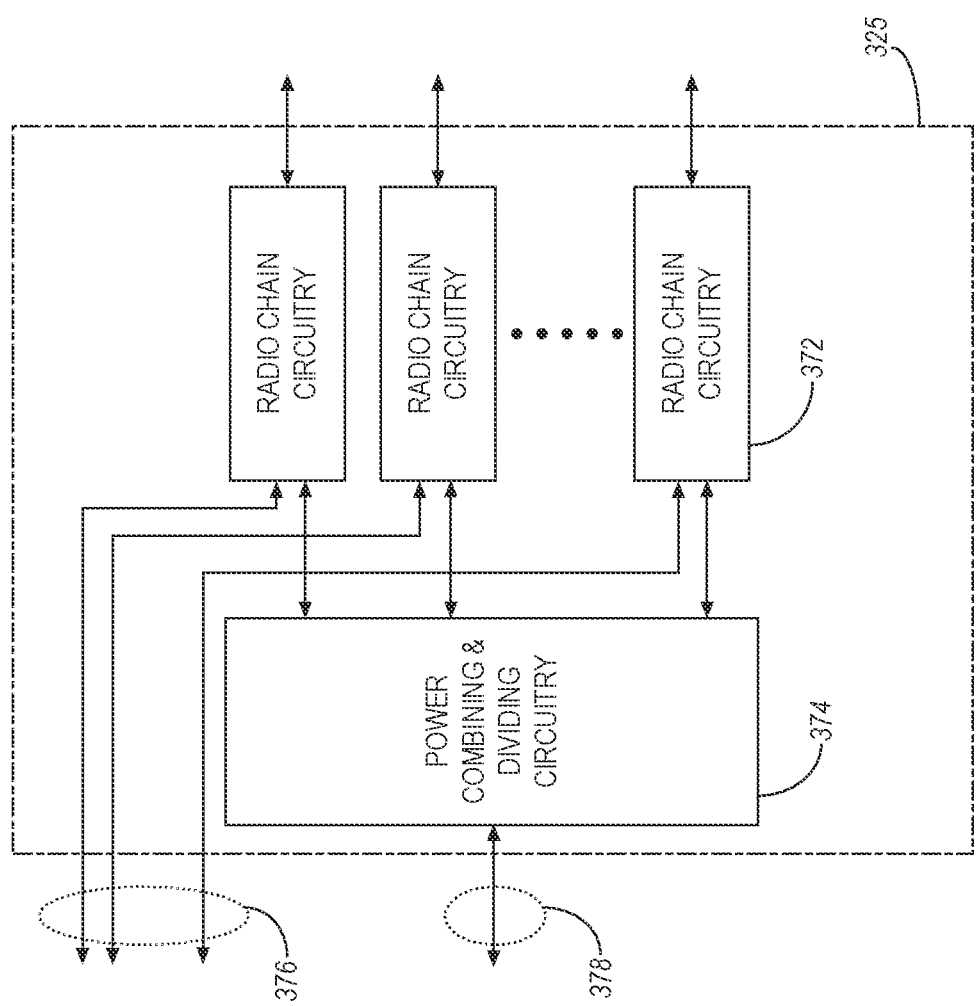
FIG. 3D illustrates aspects of exemplary radio frequency circuitry illustrated in FIG. 3A according to some aspects.

FIG. 3A illustrates exemplary wireless communication circuitry according to some aspects; FIGS. 3B and 3C illustrate aspects of transmit circuitry shown in FIG. 3A according to some aspects; FIG. 3D illustrates aspects of radio frequency circuitry shown in FIG. 3A according to some aspects; FIG. 3E illustrates aspects of receive circuitry in FIG. 3A according to some aspects. Wireless communication circuitry 300 shown in FIG. 3A may be alternatively grouped according to functions. Components illustrated in FIG. 3A are provided here for illustrative purposes and may include other components not shown in FIG. 3A.

Wireless communication circuitry 300 may include protocol processing circuitry 305 (or processor) or other means for processing. Protocol processing circuitry 305 may implement one or more of medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Wireless communication circuitry 300 may further include digital baseband circuitry 310. Digital baseband circuitry 310 may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Wireless communication circuitry 300 may further include transmit circuitry 315, receive circuitry 320 and/or antenna array circuitry 330. Wireless communication circuitry 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital baseband circuitry 310, transmit circuitry 315, receive circuitry 320, and/or RF circuitry 325.

FIGS. 3B and 3C illustrate aspects of transmit circuitry shown in FIG. 3A according to some aspects. Transmit circuitry 315 shown in FIG. 3B may include one or more of digital to analog converters (DACs) 340, analog baseband circuitry 345, up-conversion circuitry 350 and/or filtering and amplification circuitry 355. DACs 340 may convert digital signals into analog signals. Analog baseband circuitry 345 may perform multiple functions as indicated below. Up-conversion circuitry 350 may up-convert baseband signals from analog baseband circuitry 345 to RF frequencies (e.g., mmWave frequencies). Filtering and amplification circuitry 355 may filter and amplify analog signals. Control signals may be supplied between protocol processing circuitry 305 and one or more of DACs 340, analog baseband circuitry 345, up-conversion circuitry 350 and/or filtering and amplification circuitry 355.

Transmit circuitry 315 shown in FIG. 3C may include digital transmit circuitry 365 and RF circuitry 370. In some aspects, signals from filtering and amplification circuitry 355 may be provided to digital transmit circuitry 365. As above, control signals may be supplied between protocol processing circuitry 305 and one or more of digital transmit circuitry 365 and RF circuitry 370.

FIG. 3D illustrates aspects of radio frequency circuitry shown in FIG. 3A according to some aspects. Radio frequency circuitry 325 may include one or more instances of radio chain circuitry 372, which in some aspects may include one or more filters, power amplifiers, low noise amplifiers, programmable phase shifters and power supplies.

Radio frequency circuitry 325 may also in some aspects include power combining and dividing circuitry 374. In some aspects, power combining and dividing circuitry 374 may operate bidirectionally, such that the same physical circuitry may be configured to operate as a power divider when the device is transmitting, and as a power combiner when the device is receiving. In some aspects, power combining and dividing circuitry 374 may include one or more wholly or partially separate circuitries to perform power dividing when the device is transmitting and power combining when the device is receiving. In some aspects, power combining and dividing circuitry 374 may include passive circuitry including one or more two-way power divider/combiners arranged in a tree. In some aspects, power combining and dividing circuitry 374 may include active circuitry including amplifier circuits.

In some aspects, radio frequency circuitry 325 may connect to transmit circuitry 315 and receive circuitry 320 in FIG. 3A. Radio frequency circuitry 325 may connect to transmit circuitry 315 and receive circuitry 320 via one or more radio chain interfaces 376 and/or a combined radio chain interface 378. In some aspects, one or more radio chain interfaces 376 may provide one or more interfaces to one or more receive or transmit signals, each associated with a single antenna structure. In some aspects, the combined radio chain interface 378 may provide a single interface to one or more receive or transmit signals, each associated with a group of antenna structures.

FIG. 3E illustrates aspects of receive circuitry in FIG. 3A according to some aspects. Receive circuitry 320 may include one or more of parallel receive circuitry 382 and/or one or more of combined receive circuitry 384. In some aspects, the one or more parallel receive circuitry 382 and one or more combined receive circuitry 384 may include one or more Intermediate Frequency (IF) down-conversion circuitry 386, IF processing circuitry 388, baseband down-conversion circuitry 390, baseband processing circuitry 392, and analog-to-digital converter (ADC) circuitry 394. As used herein, the term "intermediate frequency" refers to a frequency to which a carrier frequency (or a frequency signal) is shifted as an intermediate step in transmission, reception, and/or signal processing. IF down-conversion circuitry 386 may convert received RF signals to IF. IF processing circuitry 388 may process the IF signals, e.g., via filtering and amplification. Baseband down-conversion circuitry 390 may convert the signals from IF processing circuitry 388 to baseband. Baseband processing circuitry 392 may process the baseband signals, e.g., via filtering and amplification. ADC circuitry 394 may convert the processed analog baseband signals to digital signals.

Figure 4:
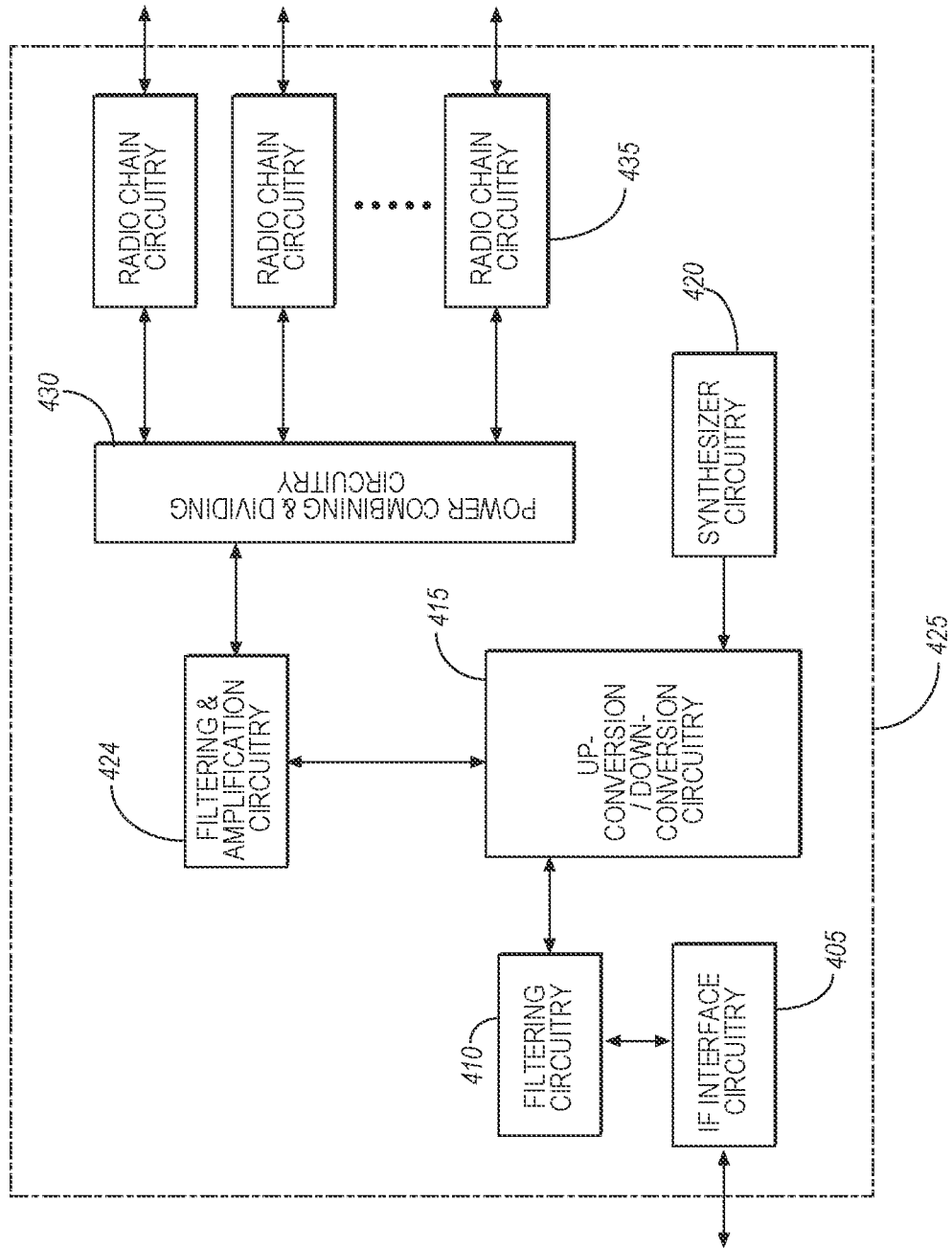
FIG. 4 illustrates exemplary useable RF circuitry in FIG. 3A according to some aspects.

FIG. 4 illustrates exemplary RF circuitry of FIG. 3A according to some aspects. In an aspect, RF circuitry 325 in FIG. 3A (depicted in FIG. 4 using reference number 425) may include one or more of the IF interface circuitry 405, filtering circuitry 410, up-conversion and down-conversion circuitry 415, synthesizer circuitry 420, filtering and amplification circuitry 424, power combining and dividing circuitry 430, and radio chain circuitry 435.

Figure 5B:
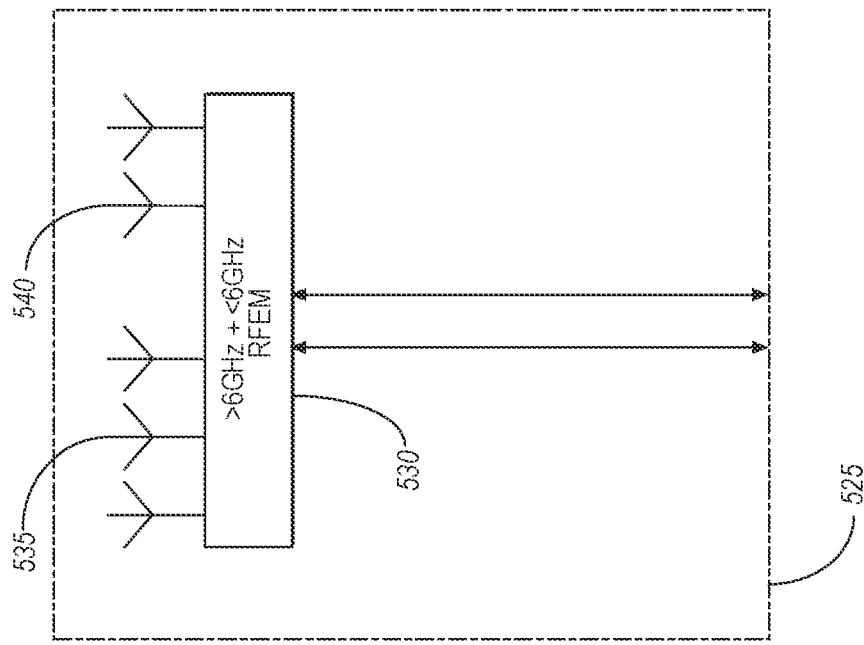
FIG. 5B illustrates an alternate aspect of an exemplary radio front end module, according to some aspects.
Figure 5A:
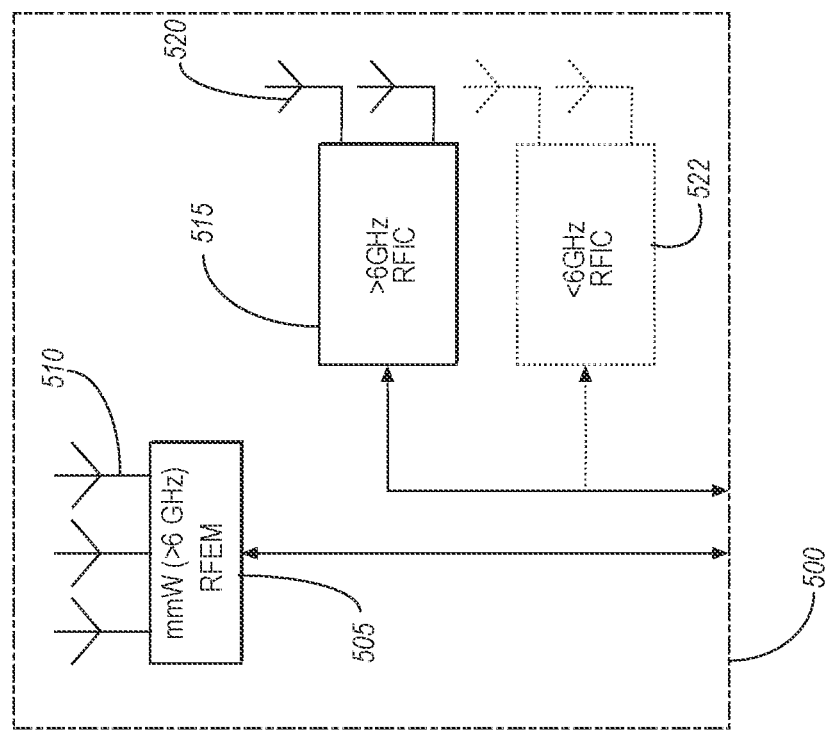
FIG. 5A illustrates an aspect of an exemplary radio front end module (RFEM) according to some aspects.

FIG. 5A and FIG. 5B illustrate aspects of a radio front-end module (RFEM) useable in the circuitry shown in FIG. 1 and FIG. 2, according to some aspects. FIG. 5A illustrates an aspect of a RFEM according to some aspects. RFEM 500 incorporates a millimeter wave RFEM 505 and one or more above-six gigahertz radio frequency integrated circuits (RFIC) 515 and/or one or more sub-six gigahertz RFICs 522. In this aspect, the one or more above-six gigahertz RFICs 515 and/or one or more sub-six gigahertz RFICs 522 may be physically separated from millimeter wave RFEM 505. RFICs 515 and 522 may include connection to one or more antennas 520. RFEM 505 may include multiple antennas 510.

FIG. 5B illustrates an alternate aspect of a radio front end module, according to some aspects. In this aspect both millimeter wave and sub-six gigahertz radio functions may be implemented in the same physical radio front end module (RFEM) 530. RFEM 530 may incorporate both millimeter wave antennas 535 and sub-six gigahertz antennas 540.

Figure 6:
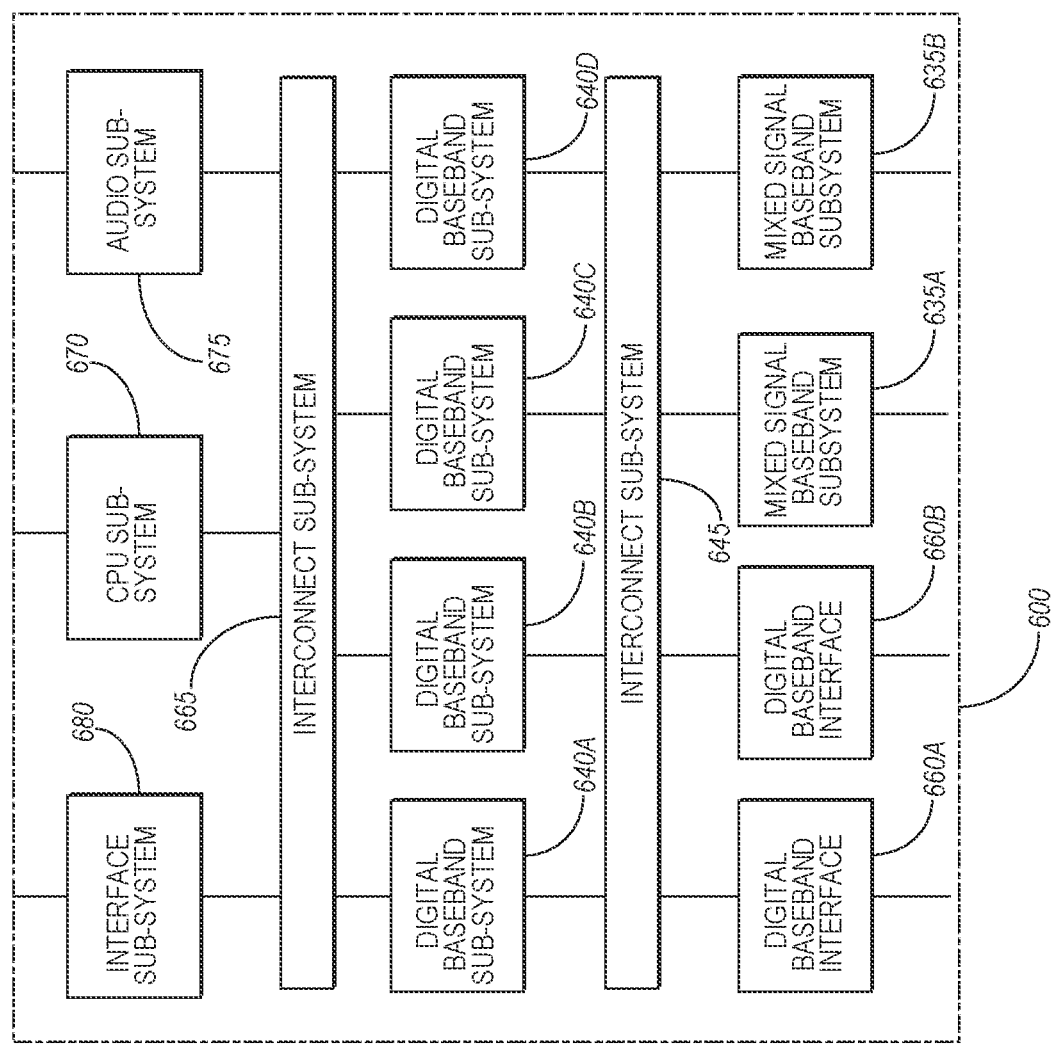
FIG. 6 illustrates an exemplary multi-protocol baseband processor useable in FIG. 1 or FIG. 2, according to some aspects.

FIG. 6 illustrates a multi-protocol baseband processor 600 useable in the system and circuitry shown in FIG. 1 or FIG. 2, according to some aspects. In an aspect, baseband processor may contain one or more digital baseband subsystems 640A, 640B, 640C, 640D, also herein referred to collectively as digital baseband subsystems 640.

In an aspect, the one or more digital baseband subsystems 640A, 640B, 640C, 640D may be coupled via interconnect subsystem 665 to one or more of CPU subsystem 670, audio subsystem 675 and interface subsystem 680. In an aspect, the one or more digital baseband subsystems 640 may be coupled via interconnect subsystem 645 to one or more of each of digital baseband interface 660A, 660B and mixed-signal baseband subsystem 635A, 635B.

In an aspect, interconnect subsystem 665 and 645 may each include one or more of each of buses point-to-point connections and network-on-chip (NOC) structures. In an aspect, audio subsystem 675 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters.

Figure 7:
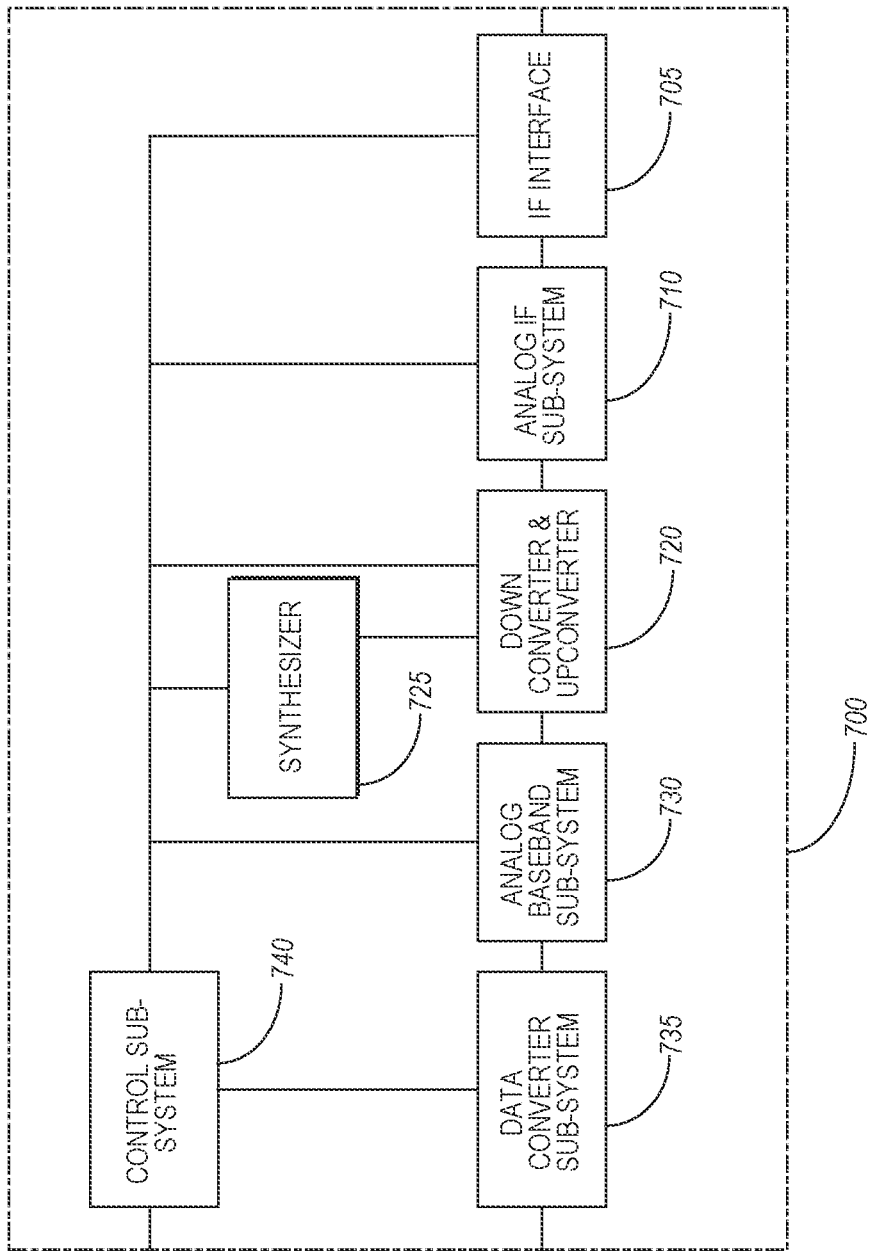
FIG. 7 illustrates an exemplary mixed signal baseband subsystem, according to some aspects.

FIG. 7 illustrates an exemplary of a mixed signal baseband subsystem 700, according to some aspects. In an aspect, mixed signal baseband subsystem 700 may include one or more of IF interface 705, analog IF subsystem 710, down-converter and up-converter subsystem 720, analog baseband subsystem 730, data converter subsystem 735, synthesizer 725 and control subsystem 740.

Figure 8A:
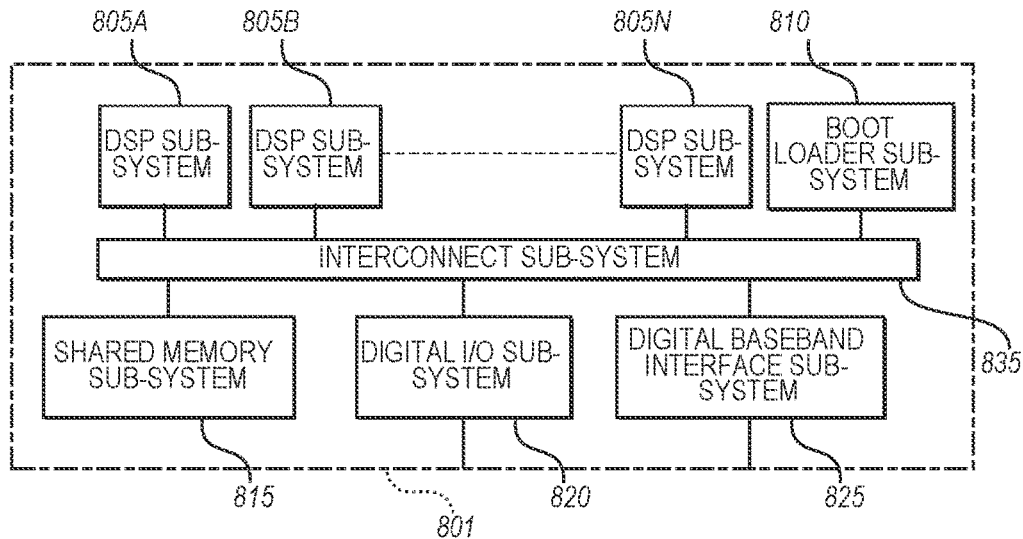
FIG. 8A illustrates an exemplary digital baseband subsystem, according to some aspects.
Figure 8B:
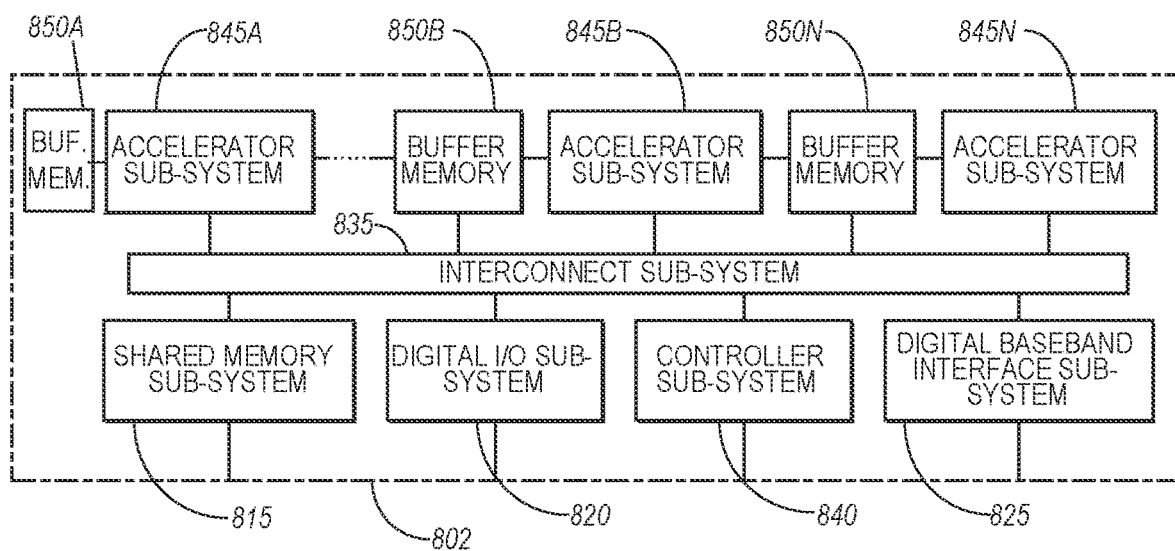
FIG. 8B illustrates an alternate aspect of an exemplary baseband processing subsystem, according to some aspects.

FIG. 8A illustrates a digital baseband processing subsystem 801, according to some aspects. FIG. 8B illustrates an alternate aspect of a digital baseband processing subsystem 802, according to some aspects.

In an aspect of FIG. 8A, the digital baseband processing subsystem 801 may include one or more of each of digital signal processor (DSP) subsystems 805A, 805B, . . . 805N, interconnect subsystem 835, boot loader subsystem 810, shared memory subsystem 815, digital I/O subsystem 820, and digital baseband interface subsystem 825.

In an aspect of FIG. 89, digital baseband processing subsystem 802 may include one or more of each of accelerator subsystem 845A, 8459, . . . 845N, buffer memory 850A, 850B, . . . 850N, interconnect subsystem 835, shared memory subsystem 815, digital I/O subsystem 820, controller subsystem 840 and digital baseband interface subsystem 825.

In an aspect, boot loader subsystem 810 may include digital logic circuitry configured to perform configuration of the program memory and running state associated with each of the one or more DSP subsystems 805. Configuration of the program memory of each of the one or more DSP subsystems 805 may include loading executable program code from storage external to digital baseband processing subsystems 801 and 802. Configuration of the running state associated with each of the one or more DSP subsystems 805 may include one or more of the steps of: setting the state of at least one DSP core which may be incorporated into each of the one or more DSP subsystems 805 to a state in which it is not running, and setting the state of at least one DSP core which may be incorporated into each of the one or more DSP subsystems 805 into a state in which it begins executing program code starting from a predefined memory location.

In an aspect, shared memory subsystem 815 may include one or more of read-only memory (ROM), static random access memory (SRAM), embedded dynamic random access memory (eDRAM) and/or non-volatile random access memory (NVRAM).

In an aspect, digital I/O subsystem 820 may include one or more of serial interfaces such as Inter-Integrated Circuit (I2C), Serial Peripheral Interface (SPI) or other 1, 2 or 3-wire serial interfaces, parallel interfaces such as general-purpose input-output (GPIO), register access interfaces and direct memory access (DMA). In an aspect, a register access interface implemented in digital I/O subsystem 820 may permit a microprocessor core external to digital baseband processing subsystem 801 to read and/or write one or more of control and data registers and memory. In an aspect, DMA logic circuitry implemented in digital I/O subsystem 820 may permit transfer of contiguous blocks of data between memory locations including memory locations internal and external to digital baseband processing subsystem 801.

In an aspect, digital baseband interface subsystem 825 may provide for the transfer of digital baseband samples between baseband processing subsystem and mixed signal baseband or radio-frequency circuitry external to digital baseband processing subsystem 801. In an aspect, digital baseband samples transferred by digital baseband interface subsystem 825 may include in-phase and quadrature (I/Q) samples.

In an aspect, controller subsystem 840 may include one or more of each of control and status registers and control state machines. In an aspect, control and status registers may be accessed via a register interface and may provide for one or more of starting and stopping operation of control state machines, resetting control state machines to a default state, configuring optional processing features, and/or configuring the generation of interrupts and reporting the status of operations. In an aspect, each of the one or more control state machines may control the sequence of operation of each of the one or more accelerator subsystems 845. There may be examples of implementations of both FIG. 8A and FIG. 8B in the same baseband subsystem.

Figure 9:
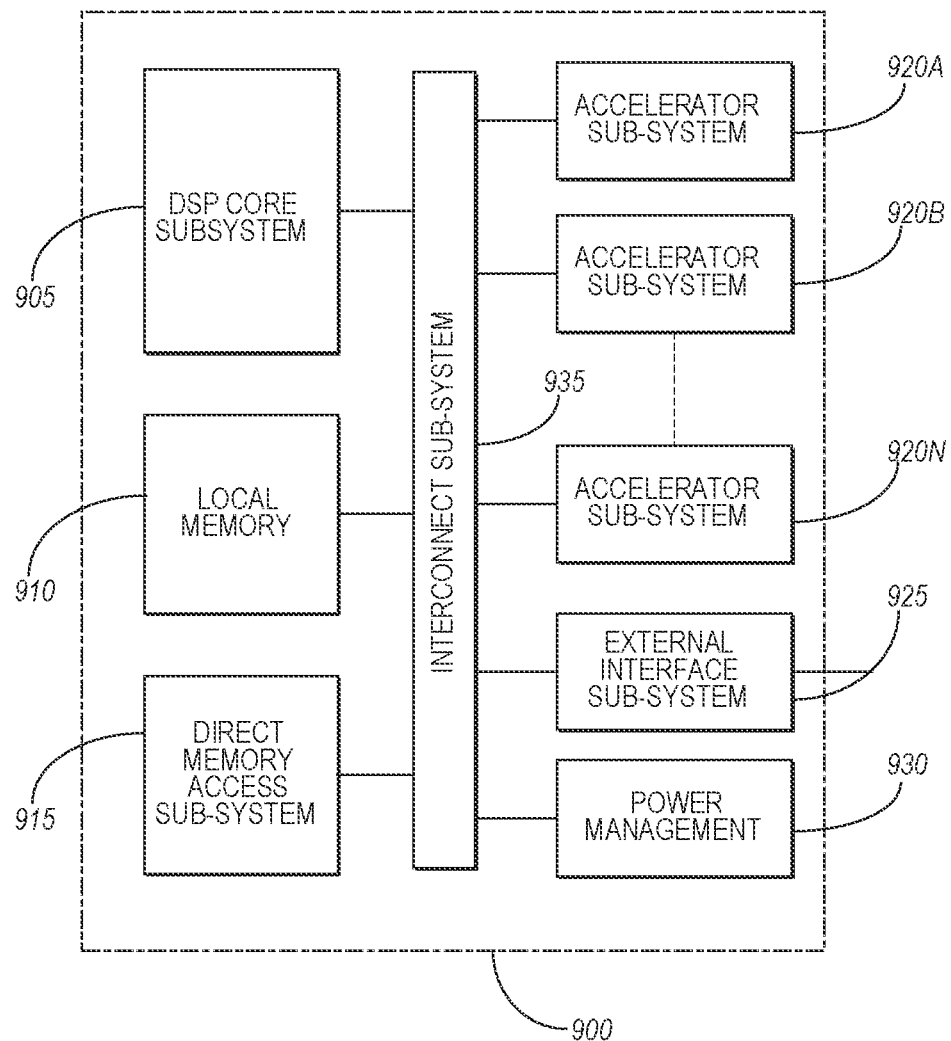
FIG. 9 illustrates an exemplary digital signal processor subsystem, according to some aspects.

FIG. 9 illustrates a digital signal processor (DSP) subsystem 900 according to some aspects. In an aspect, DSP subsystem 900 may include one or more of each of DSP core subsystem 905, local memory 910, direct memory access (DMA) subsystem 915, accelerator subsystem 920A, 920B . . . 920N, external interface subsystem 925, power management circuitry 930 and interconnect subsystem 935.

In an aspect, the local memory 910 may include one or more of each of read-only memory, static random access memory or embedded dynamic random access memory.

In an aspect, the DMA subsystem 915 may provide registers and control state machine circuitry adapted to transfer blocks of data between memory locations including memory locations internal and external to DSP subsystem 900.

In an aspect, external interface subsystem 925 may provide for access by a microprocessor system external to DSP subsystem 900 to one or more of memory, control registers and status registers which may be implemented in DSP subsystem 900. In an aspect, external interface subsystem 925 may provide for transfer of data between local memory 910 and storage external to DSP subsystem 900 under the control of one or more of the DMA subsystem 915 and the DSP core subsystem 905.

Figure 10A:
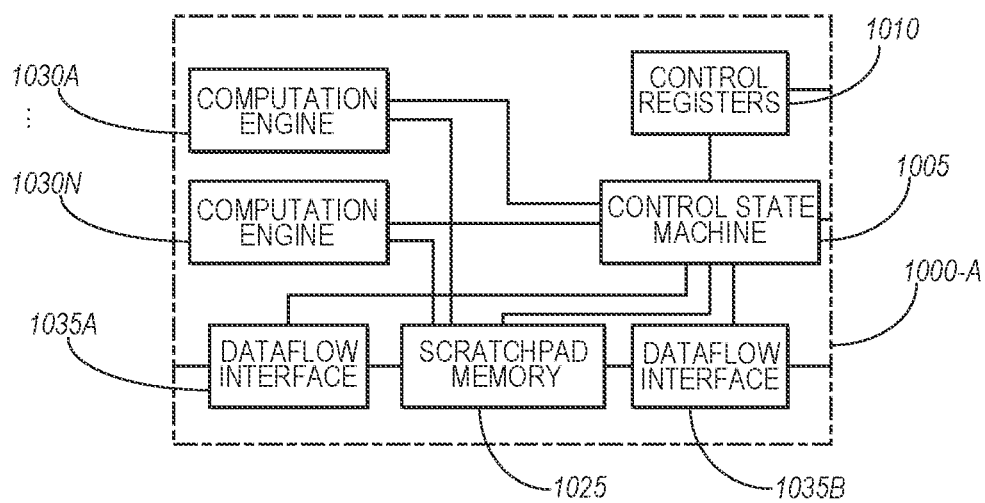
FIG. 10A illustrates an example of an accelerator subsystem, according to some aspects.
Figure 10B:
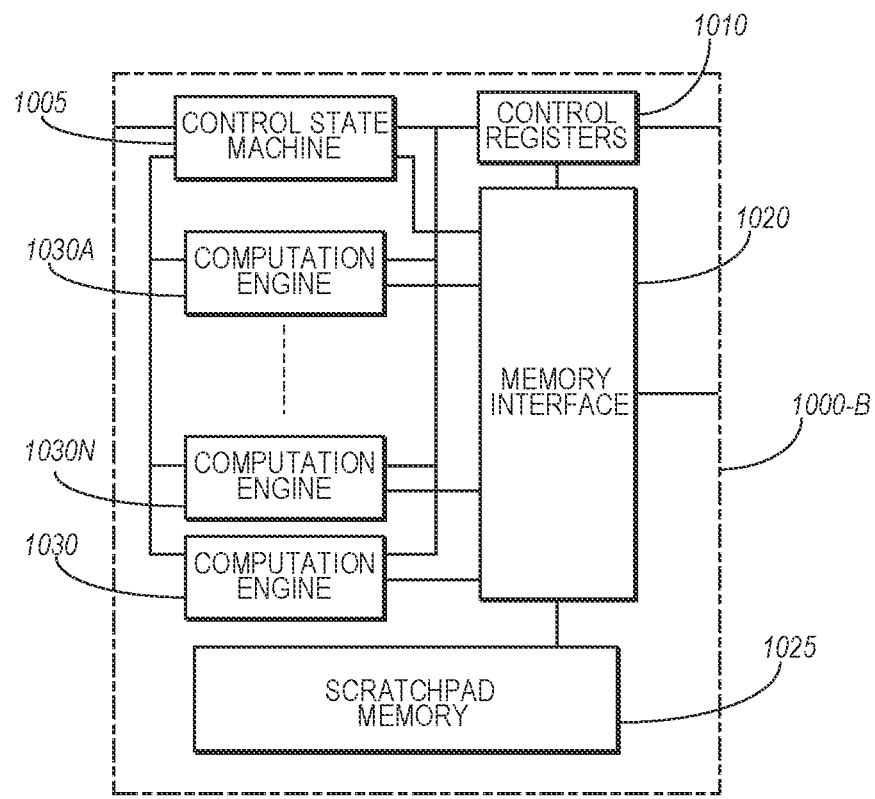
FIG. 10B illustrates an alternate exemplary accelerator subsystem, according to some aspects.

FIG. 10A illustrates an example of an accelerator subsystem 1000-A according to some aspects. FIG. 10B illustrates an example of an accelerator subsystem 1000-B according to some aspects.

In an aspect, accelerator subsystem 1000-A may include one or more of each of control state machine 1005, control registers 1010, memory interface 1020, scratchpad memory 1025, computation engines 1030A . . . 1030N, and dataflow interfaces 1035A, 1035B.

In an aspect, control registers 1010 may configure and control the operation of accelerator subsystem 1000-A or 1000-B, which may include one or more of: enabling or disabling operation by means of an enable register bit, halting an in-process operation by writing to a halt register bit, providing parameters to configure computation operations, providing memory address information to identify the location of one or more control and data structures, configuring the generation of interrupts, or other control functions.

In an aspect, control state machine 1005 may control the sequence of operation of accelerator subsystem 1000-A or 1000-B.

Figure 11:
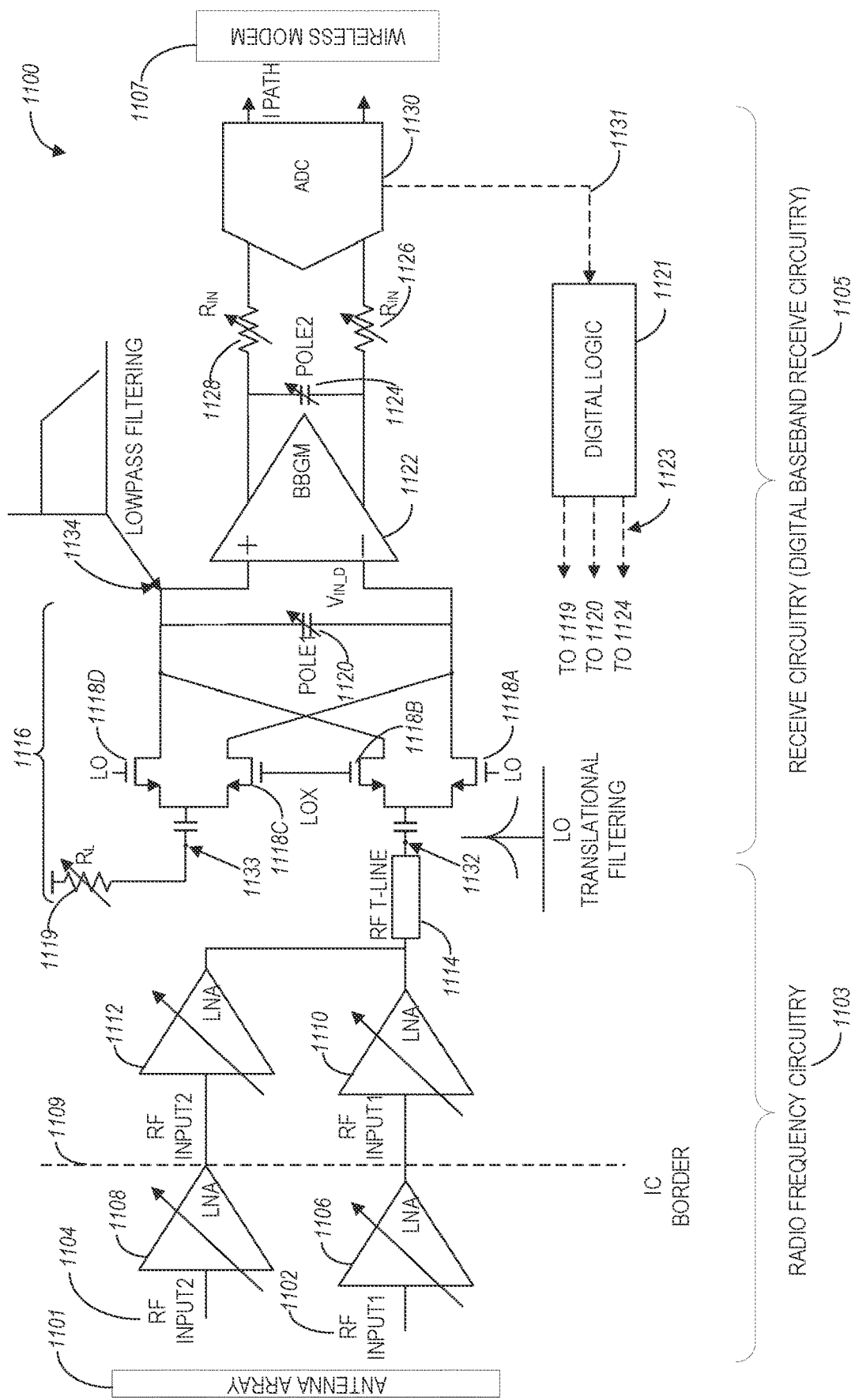
FIG. 11 illustrates an example receiver architecture using filtering poles, according to some aspects.

FIG. 11 illustrates an example receiver architecture 1100 using filtering poles, according to some aspects. Referring to FIG. 11, the receiver architecture 1100 can include an antenna array 1101, radio frequency (RF) circuitry 1103, receive circuitry (or digital baseband receive circuitry) 1105, and a wireless modem 1107.

The antenna array 1101 can be similar to the antenna array 330 of FIG. 3A, and can be configured to operate in one or more wireless bands using one or more signal processing techniques. In some aspects, the antenna array 1101 can be configured for diversity signal processing (i.e., main and diversity signals can be received or transmitted) as well as MIMO operations, such as 4×4 MIMO operations as discussed herein.

In some aspects, the antenna array 1101 can be configured for 2×2 MIMO operation. In this regard, at least a first antenna of the antenna array 1101 can be configured to receive a first plurality (e.g., nine) of main RF signals, and at least a second antenna of the antenna array 1101 can be configured to receive a second plurality (e.g., eight) of diversity RF signals. In some aspects, at least the third antenna of the antenna array 1101 can be used to receive main MIMO signals, and at least a fourth antenna of the antenna array 1101 can be used to receive diversity MIMO signals. The main and diversity MIMO signals can be processed with the main and diversity RF signals in connection with 4×4 MIMO operation, as discussed herein.

As seen in FIG. 11, the antenna array 1101 can be used to receive RF input signals 1102 and 1104. Even though only two RF input signals are illustrated in FIG. 11, the disclosure is not limited in this regard and additional RF signals can be received or transmitted by the antenna array 1101, as mentioned herein above.

The RF circuitry 1103 can be similar to the RF circuitry 325 of FIG. 3A. More specifically, the RF circuitry 1103 can include multiple low noise amplifiers (LNAs) in each signal processing path. The RF input signal 1102 can be amplified by LNAs 1106 and 1110, while the RF input signal 1104 can be amplified by LNAs 1108 and 1112. In some aspects, one or more of the LNAs associated with the RF circuitry 1103 can be located off-chip, namely, outside of the integrated circuit (IC) border 1109. In this regard, a portion of the RF circuitry 1103 (excluding LNAs 1106 and 1108) can be integrated on a single IC together with the receive circuitry 1105 and/or the wireless modem 1107.

Each of the LNAs 1106-1112 can include suitable circuitry, interfaces, and/or code and can be configured to amplify the corresponding RF input signals 1102 and 1104. In some aspects, the LNAs 1106-1112 can be variable gain LNAs, with an adjustable gain control signal being provided from a separate control circuit, e.g., digital logic 1121.

The RF circuitry 1103 can further include one or more RF transmission lines (T-lines) 1114. In some aspects, the RF T-line 1114 can incorporate radio chain circuitry (e.g., 372) and/or power combining/dividing circuitry (e.g., 374). As illustrated in FIG. 11, the RF T-line 1114 can be configured to combine the RF input signals 1102 and 1104 so that a single RF signal is provided at the input 1132 of downconversion mixer 1116.

The receive circuitry 1105 can be similar to the receive circuitry 320 in FIG. 3A and FIG. 3E. More specifically, the receive circuitry 1105 can include baseband downconversion circuitry such as the baseband downconversion mixer 1116, and baseband circuitry such as the baseband amplifier 1122 one or more filtering devices such as filtering poles POLE1 and POLE2, and one or more ADCs such as ADC 1130. The receive circuitry 1105 can further include control circuitry such as digital logic 1121.

In some aspects, the downconversion mixer 1116 can be a double-balanced downconversion mixer with mixer inputs 1132 and 1133. The mixer 1116 can include transistor devices 1118A, 1118B, 11180, and 1118D which can be configured to receive one or more local oscillator (LO) signals. As illustrated in FIG. 11, Ali a single input (i.e. input 1132) of mixer 1116 can be used to receive the single RF signal at the output of the RF T-line 1114. The second input 1133 of the mixer 1116 can be coupled to an impedance device 1119, which can be part of the filtering pole POLE1. In this regard, since only a single mixer input is used to receive an RF the mixer 1116 can be referred to as a pseudo-double balanced mixer.

The amplifier 1122 can be, e.g., a trans-conductance ($g_m$) amplifier, which can be configured to receive differential signal inputs from the output of mixer 1116, and provide the amplified differential signal outputs to the ADC 1130.

In some aspects, a first filtering pole POLE1 can be provided at the output of mixer 1116, before the baseband signal is communicated to the amplifier 1122. In an aspect, the filtering pole POLE1 can include a variable capacitor 1120 as well as an impedance device 1119 coupled to the second input 1133 of mixer 1116. The filtering pole POLE1 can be configured to suppress frequencies outside of a specified frequency range, in order to increase the selectivity of the ADC 1130 and to protect the amplifier 1122 against out-of-band signals. The amplifier 1122 and the filtering pole POLE1 can be configured to downconvert and amplify the RF signal at the output of mixer 1116 to a frequency within operation range of the ADC 1130. In some aspects, the amplifier 1122 can be an amplifier that is not a transconductance amplifier.

In some aspects, the first filtering pole POLE1 can be configured to suppress frequencies outside of a specified range. In some aspects, the filtering pole POLE1 can include one or more variable capacitors 1120 (e.g. one or more digitally trimmable capacitors), and the impedance 1119 can include one or more variable resistors or other impedances (e.g. a resistor, capacitor, inductor, or a combination thereof electrically coupled in series or in parallel). The frequency response of the filtering pole POLE1 depends on the impedance values provided by impedance device 1119 and the capacitance provided by the variable capacitor 1120, as well as the arrangement of the impedance device 1119 and the capacitor 1120 relative to one another (e.g., series or parallel electrical paths or the like). In some aspects, a trim of the capacitor 1120 and/or impedance of the impedance device 1119 can be controlled by one or more control signals 1123 generated by the digital logic 1121. Example techniques for determining filtering pole capacitor trim are discussed herein below in reference to FIG. 14 in FIG. 15.

In some aspects, filtering pole POLE1 can be configured so that LO translational filtering can take place at the input 1132 of downconversion mixer 1116. In this regard, baseband filtering before the input to the amplifier 1122 is performed, in effect passing signals at or near the LO frequency, and attenuating out-of-band signals.

In some aspects, additional signal selectivity for the ADC 1130 can be provided by incorporating a second filtering pole POLE2 at the output of the amplifier 1122. The second filtering pole POLE2 can include a trimmable capacitor 1124 in combination with one or more impedance devices (e.g., variable resistors) 1126 and 1128. In some aspects, digital trim as well as impedance values for capacitor 1124 and impedance devices 1126 and 1128 can be configured by control signals 1123 generated by the digital logic 1121.

By using the two filtering poles (POLE1 and POLE2) before the inputs to the ADC 1130, the receiver architecture 1100 can improve ADC selectivity (e.g., translational filtering at mixer input 1132, low-pass filtering at the input 1134 of amplifier 1122, as well as additional signal filtering at the output of amplifier 1122), allowing for analog-to-digital conversion with lower SNR and increased bandwidth.

The digital logic 1121 can include suitable circuitry, interfaces, and/or code and can be configured to generate control signals 1123 based on, e.g., a digital output signal 1131 generated by the ADC 1130 or another input control signal. The digital logic 1121 can include electronic components, such as at least one AND gate, OR gate, XOR gate, negate gate, current buffer, oscillator, multiplexer, resistor, transistor, capacitor, inductor, relay, or the like.

Figure 12A:
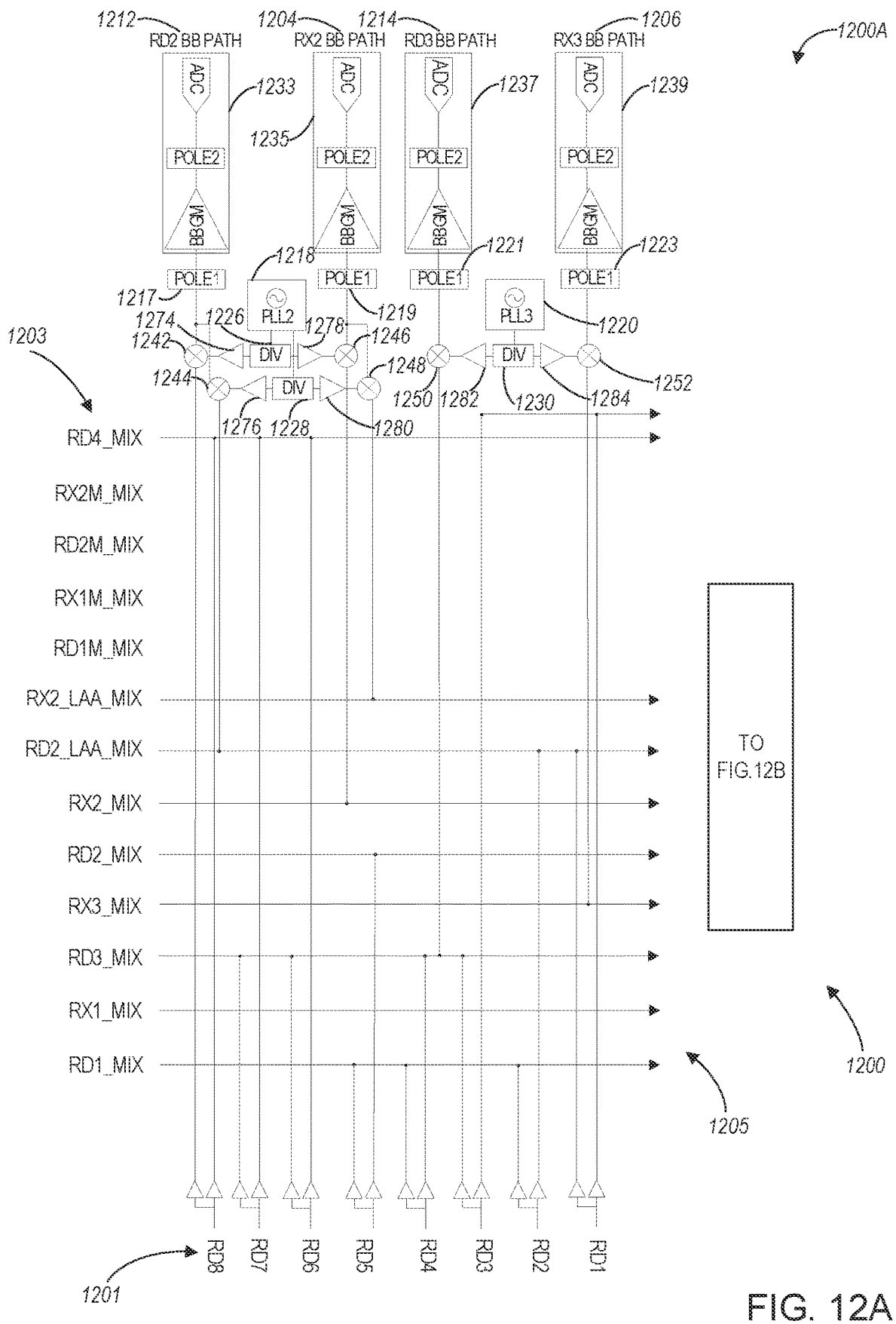
FIG. 12A and FIG. 12B illustrates an example transceiver architecture with multiple baseband processing paths which can be used in connection with 4×4 MIMO operation, according to some aspects.
Figure 12B:
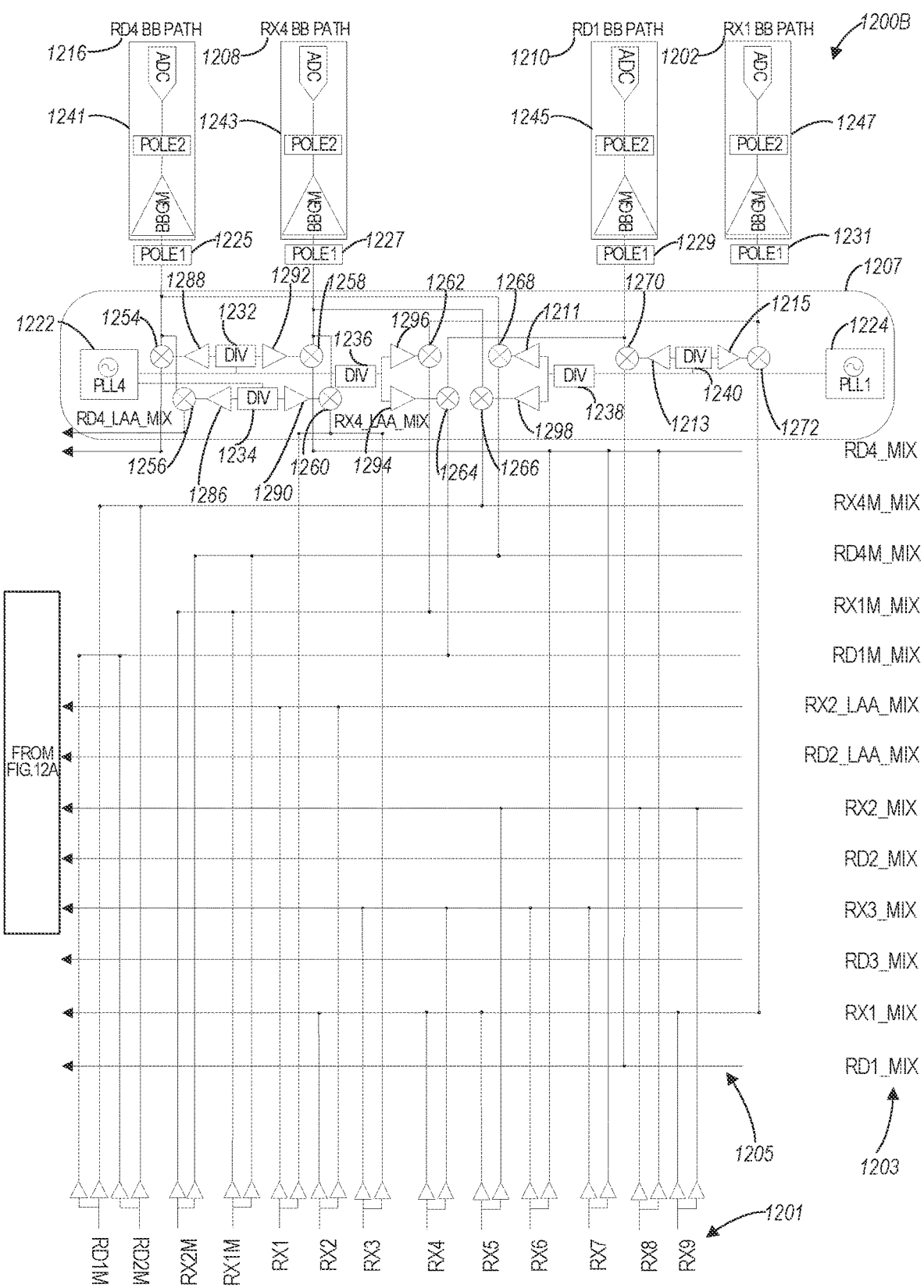

FIG. 12A and FIG. 12B illustrates an example transceiver architecture 1200 with multiple baseband processing paths, which can be used in connection with 4×4 MIMO operation, according to some aspects. The transceiver architecture 1200 is illustrated in connection with processing the received signals but similar functionalities can be used in connection with processing transmit signals. For simplicity, the transceiver architecture 1200 is split into a first receiver portion 1200A illustrated in FIG. 12A and a second receiver portion 1200B illustrated in FIG. 12B.

The transceiver architecture 1200 can receive a plurality of RF input signals 1201 from, e.g., an antenna array such as the antenna array 1101. The RF input signals 1201 can include main RF input signals RX1-RX9, diversity RF input signals RD1-RD8, main MIMO input signals RX1M/RX2M, and diversity MIMO input signals RD1M/RD2M. In some aspects, each of these four types of signals can be received by separate antennas within the antenna array 1101.

In some aspects, processing of the main and diversity input signals can be configured using corresponding baseband processing paths, each processing path including similar components to the receiver architecture 1100 of FIG. 11. As illustrated in FIG. 12A and FIG. 12B, the main RF input signals can be processed by baseband processing paths 1202, 1204, 1206, and 1208. The diversity RF input signals can be processed by baseband processing paths 1210, 1212, 1214, and 1216.

Initially, the RF input signals 1201 can be amplified by one or more LNAs, such as LNAs 1106-1112 in FIG. 11. The amplified RF signals can be communicated via the RF transmission lines 1205 to corresponding circuitry within the baseband transmission paths for further processing. In some aspects, the RF transmission lines 1205 can be configured to combine one or more of the RF input signals 1201 and generate various combined signals 1203, which can be communicated for additional processing within a corresponding baseband processing path. For example, the RD1 baseband processing path 1210 receives a single combined RF signal RD1_MIX, which includes RF signals RD2, RD4, and RD5.

Baseband processing path 1202 can include a downconversion mixer 1272 (which can be similar to mixer 1116), a first filtering pole 1231 (which can be similar to filtering pole POLE1 in FIG. 11), and baseband processing circuitry 1247. The baseband processing circuitry 1247 can include an amplifier (e.g., BBGM or a baseband transconductance amplifier similar to the amplifier 1122), a second filtering pole (which can be similar to POLE2 in FIG. 11), and an ADC (which can be similar to ADC 1130 in FIG. 11).

Baseband processing path 1204 can include a downconversion mixer 1246 (which can be similar to mixer 1116), a first filtering pole 1219 (which can be similar to filtering pole POLE1 in FIG. 11), and baseband processing circuitry 1235. The baseband processing circuitry 1235 can include an amplifier (e.g., BBGM or a baseband transconductance amplifier similar to the amplifier 1122), a second filtering pole (which can be similar to POLE2 in FIG. 11), and an ADC (which can be similar to ADC 1130 in FIG. 11).

Baseband processing path 1206 can include a downconversion mixer 1252 (which can be similar to mixer 1116), a first filtering pole 1223 (which can be similar to filtering pole POLE1 in FIG. 11), and baseband processing circuitry 1239. The baseband processing circuitry 1239 can include an amplifier (e.g., BBGM or a baseband transconductance amplifier similar to the amplifier 1122), a second filtering pole (which can be similar to POLE2 in FIG. 11), and an ADC (which can be similar to ADC 1130 in FIG. 11).

Baseband processing path 1208 can include a downconversion mixer 1258 (which can be similar to mixer 1116), a first filtering pole 1227 (which can be similar to filtering pole POLE1 in FIG. 11), and baseband processing circuitry 1243. The baseband processing circuitry 1243 can include an amplifier (e.g., BBGM or a baseband transconductance amplifier similar to the amplifier 1122), a second filtering pole (which can be similar to POLE2 in FIG. 11), and an ADC (which can be similar to ADC 1130 in FIG. 11).

Baseband processing path 1210 can include a downconversion mixer 1270 (which can be similar to mixer 1116), a first filtering pole 1229 (which can be similar to filtering pole POLE1 in FIG. 11), and baseband processing circuitry 1245. The baseband processing circuitry 1245 can include an amplifier (e.g., BBGM or a baseband transconductance amplifier similar to the amplifier 1122), a second filtering pole (which can be similar to POLE2 in FIG. 11), and an ADC (which can be similar to ADC 1130 in FIG. 11).

Baseband processing path 1212 can include a downconversion mixer 1242 (which can be similar to mixer 1116), a first filtering pole 1217 (which can be similar to filtering pole POLE1 in FIG. 11), and baseband processing circuitry 1233. The baseband processing circuitry 1233 can include an amplifier (e.g., BBGM or a baseband transconductance amplifier similar to the amplifier 1122), a second filtering pole (which can be similar to POLE2 in FIG. 11), and an ADC (which can be similar to ADC 1130 in FIG. 11).

Baseband processing path 1214 can include a downconversion mixer 1250 (which can be similar to mixer 1116), a first filtering pole 1221 (which can be similar to filtering pole POLE1 in FIG. 11), and baseband processing circuitry 1237. The baseband processing circuitry 1237 can include an amplifier (e.g., BBGM or a baseband transconductance amplifier similar to the amplifier 1122), a second filtering pole (which can be similar to POLE2 in FIG. 11), and an ADC (which can be similar to ADC 1130 in FIG. 11).

Baseband processing path 1216 can include a downconversion mixer 1254 (which can be similar to mixer 1116), a first filtering pole 1225 (which can be similar to filtering pole POLE1 in FIG. 11), and baseband processing circuitry 1241. The baseband processing circuitry 1241 can include an amplifier (e.g., BBGM or a baseband transconductance amplifier similar to the amplifier 1122), a second filtering pole (which can be similar to POLE2 in FIG. 11), and an ADC (which can be same to ADC 1130 in FIG. 11).

In some aspects, the same PLL (or quadgen) can be used for main and diversity baseband signal processing paths. For example and as illustrated in FIG. 12A and FIG. 12B, main signal baseband processing path 1204 and diversity signal baseband processing path 1212 can share the same PLL 1218 and the same LO signal divider 1226 to generate LO signals driving the corresponding downconversion mixers 1246 and 1242. LO signals generated by divider 1226 can be further amplified by amplifiers 1274 and 1278.

Similarly, the main signal baseband processing path 1206 and diversity signal baseband processing path 1214 can share the same PLL 1220 and the same LO signal divider 1230 to generate LO signals driving the corresponding downconversion mixers 1252 and 1250. LO signals generated by divider 1230 can be further amplified by amplifiers 1282 and 1284.

Main signal baseband processing path 1208 and diversity signal baseband processing path 1216 can share the same PLL 1222 and the same LO signal divider 1232 to generate LO signals driving the corresponding downconversion mixers 1258 and 1254. LO signals generated by divider 1232 can be further amplified by amplifiers 1288 and 1292.

Main signal baseband processing path 1202 and diversity signal baseband processing path 1210 can share the same PLL 1224 and the same LO signal divider 1240 to generate LO signals driving the corresponding downconversion mixers 1272 and 1270. LO signals generated by divider 1240 can be further amplified by LO signal amplifiers 1213 and 1215.

As illustrated in FIG. 12A and FIG. 12B, corresponding main signal and diversity signal baseband processing paths can be located close to each other (e.g., using neighboring baseband paths) so that a PLL and a corresponding PLL divider circuitry can be located close to each of the main and diversity baseband processing paths, avoiding longer interconnects for transporting high-powered LO signals. Additionally, the transceiver architecture 1200 can use the RF transmission line network 1205 two route RF signals two corresponding downconversion mixers in the baseband paths, instead of having to route a higher powered LO signals using longer interconnects to the downconversion mixers. In this regard, by having short interconnects from the PLL and the PLL dividers to the downconversion mixers (and instead having longer interconnects within the RF transmission line network 1205), signal coupling and crosstalk interference can be reduced within the transceiver architecture 1200.

In some aspects, some of the baseband processing paths within the transceiver architecture 1200 can be used to process wireless signals associated with different communication bands. For example, main signal processing path 1204 and diversity signal processing path 1212 can include additional mixers 1248 and 1244, respectively, which can be used for downconverting signals received in a different communication band than the signals received and downconverted by mixers 1246 and 1242. The PLL 1218, which is shared between the neighboring baseband processing paths 1204 and 1212, can also supply an LO signal to both mixers 1248 and 1244 via the divider 1228 and the amplifiers 1276 and 1280.

Similarly, main signal processing path 1208 and diversity signal processing path 1216 can include additional mixers 1260 and 1256, respectively, which can be used for downconverting signals received in a different communication band than the signals received and downconverted by mixers 1258 and 1254. The PLL 1222, which is shared between the neighboring baseband processing paths 1208 and 1216, can also supply an LO signal to both mixers 1260 and 1256 via the divider 1234 and the amplifiers 1286 and 1290.

In some aspects, the transceiver architecture 1200 can include MIMO circuitry 1207, which can be used for processing signals in a 4×4 MIMO configuration. More specifically, the MIMO circuitry 1207 can include RF circuitry associated with baseband processing paths 1202, 1210, 1208, and 1216, such as PLLs 1224 and 1222, signal dividers 1240 and 1232, LO signal amplifiers 1215, 1213, 1292, and 1288, and downconversion mixers 1272, 1270, 1258, and 1254. Additionally, the MIMO circuitry 1207 can include dividers 1238 and 1236 configured to divide LO signals generated by PLLs 1224 and 1222 respectively, LO signal amplifiers 1211, 1298, 1296, and 1294, and downconversion mixers 1268, 1266, 1264, and 1262.

As illustrated in FIG. 12B, downconversion mixers 1268 and 1266 can be used for processing MIMO diversity and main signals, reusing portions of baseband processing paths 1216 and 1208, respectively (e.g., POLE1 POLE2, BBGM and ADC circuitry). Similarly, downconversion mixers 1264 and 1262 can be used for processing MIMO diversity and main signals, reusing portions of baseband processing paths 1210 and 1202, respectively (e.g., POLE1, POLE2, BBGM and ADC circuitry).

In an example 4×4 MIMO operation (e.g., using a 4×4 MIMO antenna array), main RF input signal RX1_MIX can be communicated to downconversion mixer 1272 for processing in the main baseband processing path 1202. A corresponding diversity input signal RD1_MIX can be communicated to downconversion mixer 1270 for processing in the diversity baseband processing path 1210. Corresponding main MIMO signal RX4M_MIX can be communicated to downconversion mixer 1266 within the MIMO circuitry 1207, and then to main baseband processing path 1208 for further processing. Corresponding diversity MIMO signal RD4M_MIX can be communicated to downconversion mixer 1268 within the MIMO circuitry 1207, and then to diversity baseband processing path 1216 for further processing. In this regard, the same PLL 1224 can be used to generate LO signals to downconvert all four (RX1_MIX, RD1_MTX, RX4M_MIX, and RD4M_MIX) of the 4×4 MIMO input signals, with a signal processing of the main and diversity MIMO 40 signals reusing portions of existing baseband processing paths (namely, baseband processing paths 1208 and 1216).

In an example 4×4 MIMO operation, main RF input signal can be communicated to downconversion mixer 1258 for processing in the main baseband processing path 1208. A corresponding diversity input signal can be communicated to downconversion mixer 1254 for processing in the diversity baseband processing path 1216. Corresponding main MIMO signal can be communicated to downconversion mixer 1262 within the AMINO circuitry 1207, and then to main baseband processing path 1202 for further processing. Corresponding diversity MIMO signal can be communicated to downconversion mixer 1264 within the MIMO circuitry 1207, and then to diversity baseband processing path 1210 for further processing. In this regard, the same PLL 1222 can be used to generate LO signals to downconvert all four of the 4×4 MIMO input signals, with a signal processing of the main and diversity MIMO signals reusing portions of existing baseband processing paths (namely, baseband processing paths 1210 and 1202).

Figure 13:
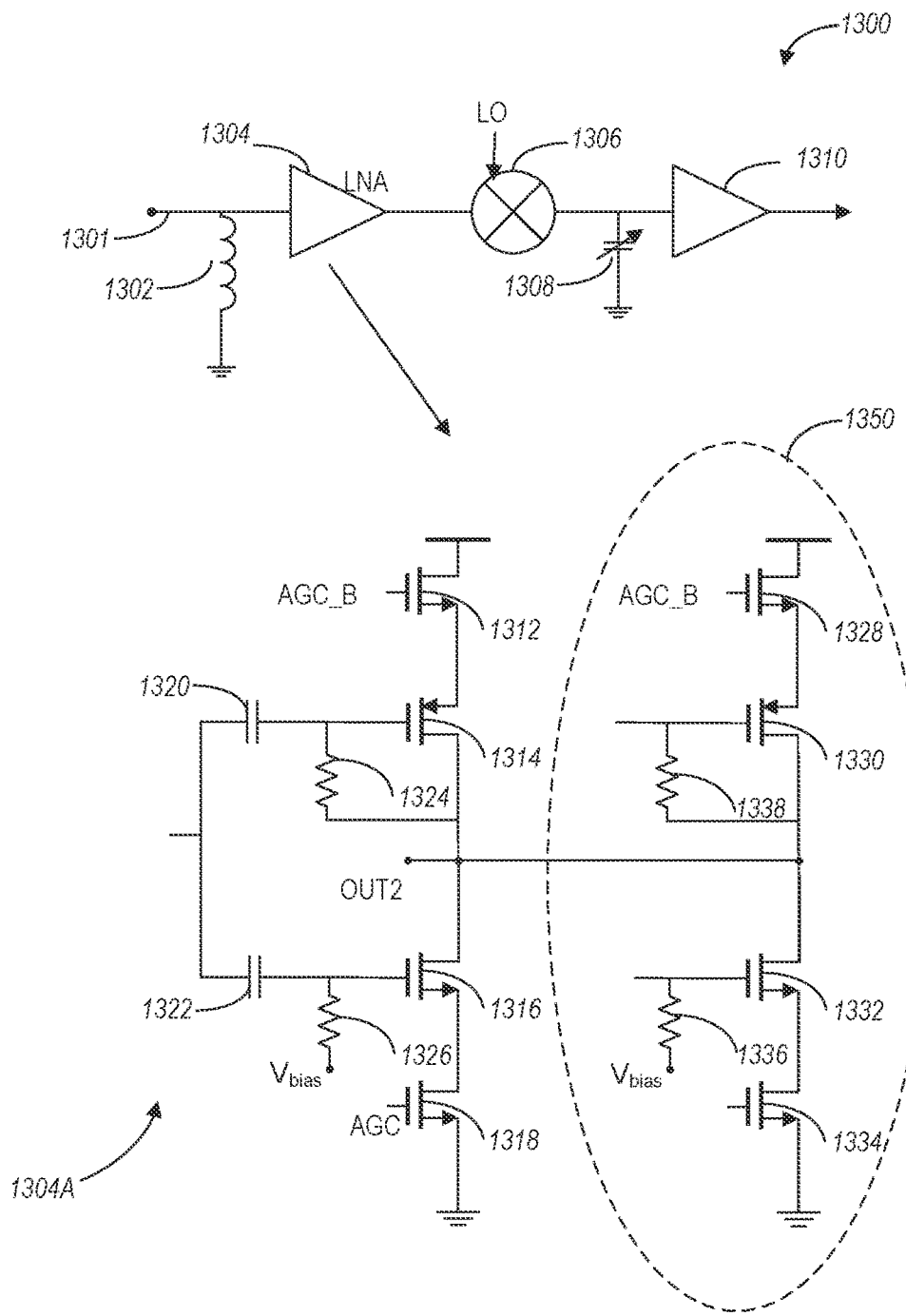
FIG. 13 illustrates an electric diagram of an example low noise amplifier (LNA) with a fixed output stage providing constant impedance to a mixer pole, according to some aspects.

FIG. 13 illustrates an electric diagram of an example low noise amplifier (LNA) with a fixed output stage providing constant impedance to a mixer pole, according to some aspects. Referring to FIG. 13, there is illustrated receiver circuitry 1300 which can be similar to the circuitry of receiver architecture 1100 of FIG. 11. More specifically, receiver circuitry 1300 can include a signal matching component 1302, an LNA 1304, a downconversion mixer 1306, a filtering pole 1308, and a baseband amplifier 1310 for processing and input signal 1301. FIG. 13 further illustrates a more detailed diagram 1304A of the LNA 1304.

As illustrated in diagram 1304A, in some aspects, the LNA 1304 can include serially coupled transistor devices 1312, 1314, 1316, and 1318; resistors 1324 and 3026; and capacitors 1320 and 1322, all coupled as illustrated in diagram 1304A. In some aspects, automatic gain control inputs can be provided to control terminals of transistor devices 1312 and 1318, to control signal amplification by the LNA 1304.

In some aspects, peak shift variation of the filtering pole 1308 at the output of mixer 1306, where the filtering pole peak frequency can vary with LO, can be minimized (i.e., minimizing pole variation and peak shift variation) by using a fixed output stage in the LNA 1304. More specifically, the LNA 1304 can include an output impedance compensation path 1350 coupled to the output terminal OUT2 of the LNA. In some aspects; the output impedance compensation path 1350 can include serially coupled transistor devices 1328, 1330, 1332, and 1334, as well as impedance devices 1336 and 1338; all coupled as illustrated in diagram 1304A, FIG. 14 in FIG. 15 provide further details on determining a capacitor trim for the filtering pole (e.g., POLE1 or 1308).

Figure 14:
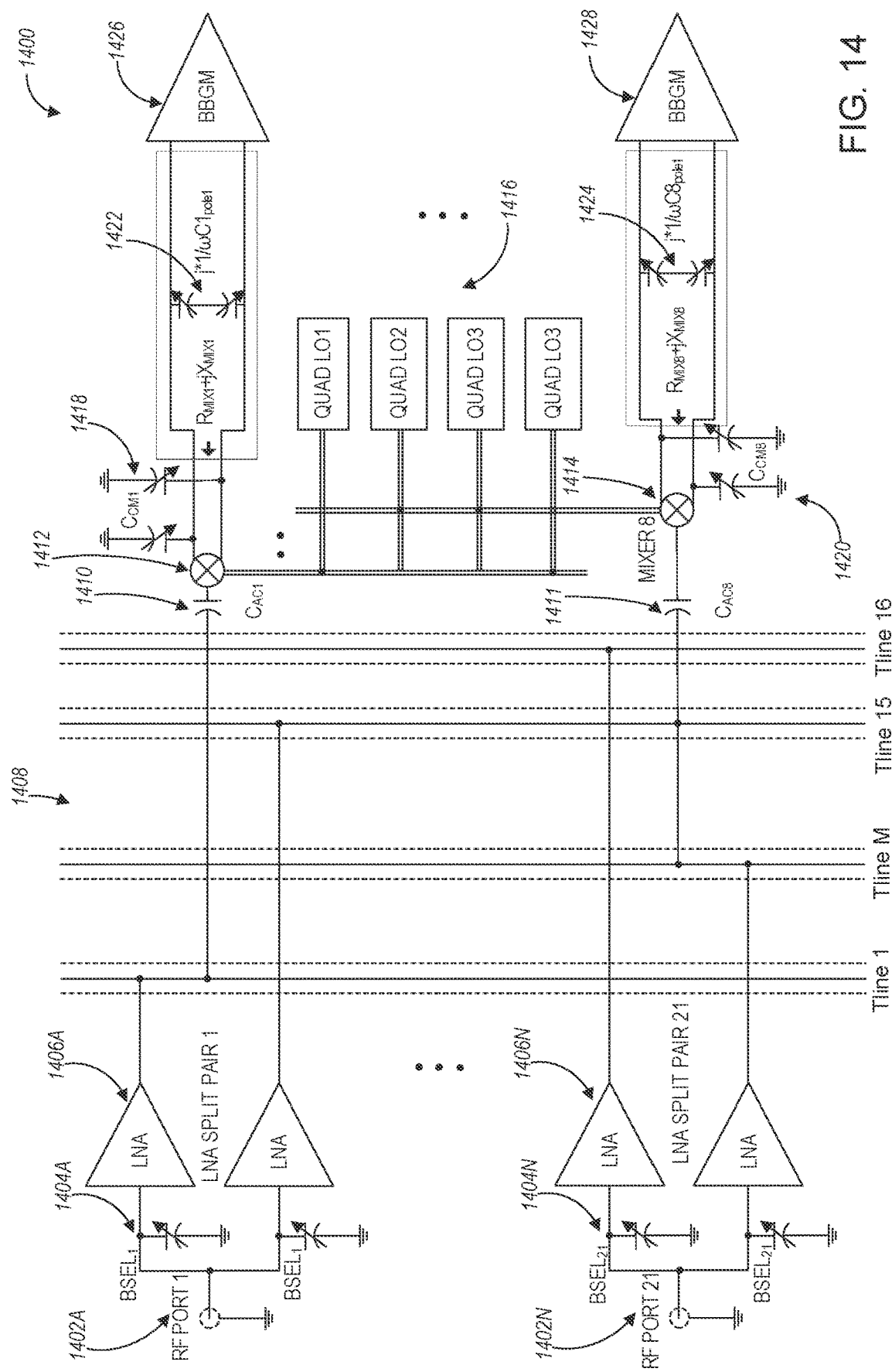
FIG. 14 illustrates a conceptual block diagram of filtering poles used in connection with a wireless transceiver, according to some aspects.

FIG. 14 illustrates a conceptual block diagram of filtering poles used in connection with a wireless transceiver, according to some aspects. Referring to FIG. 14, there is illustrated receiver architecture 1400, which can include portions of transceiver architecture 1200 illustrated in FIG. 12A and FIG. 12B. Receiver architecture 1400 can include RF ports 1402A-1402N providing RF signal inputs. In one aspect, 21 different RF input signals can be provided, as illustrated in FIG. 12A and FIG. 12B. The input RF signals can be amplified by corresponding LNA pairs 1406A-1406N, where each of the LNAs can include a matching variable capacitor 1404A-1404N. A band select signal (BSEL) can be used to vary the capacitance for the matching capacitor 1404A-1404N, for purposes of, e.g., band selection. The amplified RF signals can be communicated to corresponding downconversion mixers 1412-1414 via the RF transmission line network 1408. The downconversion mixers 1412-1414 can be capacitively (AC) coupled to the RF transmission line network 1408 via corresponding capacitors 1410-1411 in corresponding baseband processing paths. The communication path between the mixer and the corresponding filtering pole can be associated with common: mode capacitance 1418-1420. The downconversion mixers 1412-1414 can be coupled to corresponding filtering poles 1422-1424 and baseband amplifiers 1426-1428, The downconversion mixers 1412-1414 can receive one or more of the LO signals 1416.

In some aspects, the effective filtering pole frequency response for poles 1422-1424 can be a function of the overall impedance $R_{MIXi}+jX_{MIXi}$ at the end of the downconversion mixer in parallel with the capacitance of the pole $j*1/\omega Ci_{pole\ i}$, or $(R_{mix}+jX_{mix})\|j*1/\omega C_{pole1}$ (for pole 1422).

In some aspects, the overall impedance $R_{MIXi}+X_{MIXi}$ at the end of the downconversion mixer can depend on mixer AC coupling capacitance (of capacitors 1410-1411), mixer device impedance, mixer LO frequency, transmission line length and parasitic loading, LNA output impedance, Bsel (band select capacitance), port matching (not shown in FIG. 14), and common mode capacitance, $C_{CM}$ (1418-1420).

In some aspects, effective filtering pole (1422-1424) frequency response can be frequency controlled by pole trim (e.g., selecting the Ci value) and can be used to accommodate systemic and process dependences of various receive paths.

FIG. 15 illustrates an example firmware table 1500, which can be used to configure the filtering poles of FIG. 14, according to some aspects. More specifically, firmware table 1500 can be sized to accommodate a plurality of dependent variables (e.g., 21 ports×2 LNA Splits×13 bandwidth modes×5 Sub-Bands×2 (for Systemic Trim & Process Offset)+210 Trend Slopes). In some aspects, the firmware table 1500 can include other dependent variables, which can be used to determine the filtering pole trim.

In some aspects, wireless transceiver firmware, upon setting up the cellular operating mode (which establishes port, split, LO, and Baseband path), can be configured to calculate a $C_{pole1}$Trim for that particular baseband (BB) path, based on the following equation: $C_{pole1}$Trim=Table Trim Value+(Table Proc Value*BB Fuse Value)/128+((F_LO−F_cen)*Table Trend Value)/32768.

The variables "Table Trim Value" and "Table Proc Value" can be obtained from the firmware table 1500, based on values in the first three columns which are established upon setting up the cellular operating mode. The variable F_cen is the center operating frequency of the sub-band.

In some aspects, the transceiver firmware can be configured to use the LO (F_LO) to determine which "SubBand" row applies to the present setup. In this regard, a wide operating mode of frequencies (sometimes ~2 GHz) can be sub-divided into more controlled regions of operation, allowing a piece-wise linear adaption of the $C_{pole1}$trim.

In some aspects, a "Trend Value" or slope effect of the trim (last column in the firmware table 1500) can be used to more finely adjust the $C_{pole1}$Trim, particularly lower LO frequency operating regions (also known as LB), where the effective BW of $C_{pole1}$ is less dominated by RF path parasitics, and is influenced more by LO frequency effect on mixer impedance.

In some aspects, the $C_{pole1}$Trim value is scaled for process variations using a fusing value, derived during testing of the die, to represent each baseband paths effect on Pole1 (e.g., 1422-1424) BW, by measuring a fixed trim value on each BB path, calculating a fusing value derived from a large sample size of material to establish variations, including die-to-die variations across the wafer. In some aspects, the above referenced filtering pole trim determination can be performed by the digital logic 1121 in FIG. 11.

Figure 16:
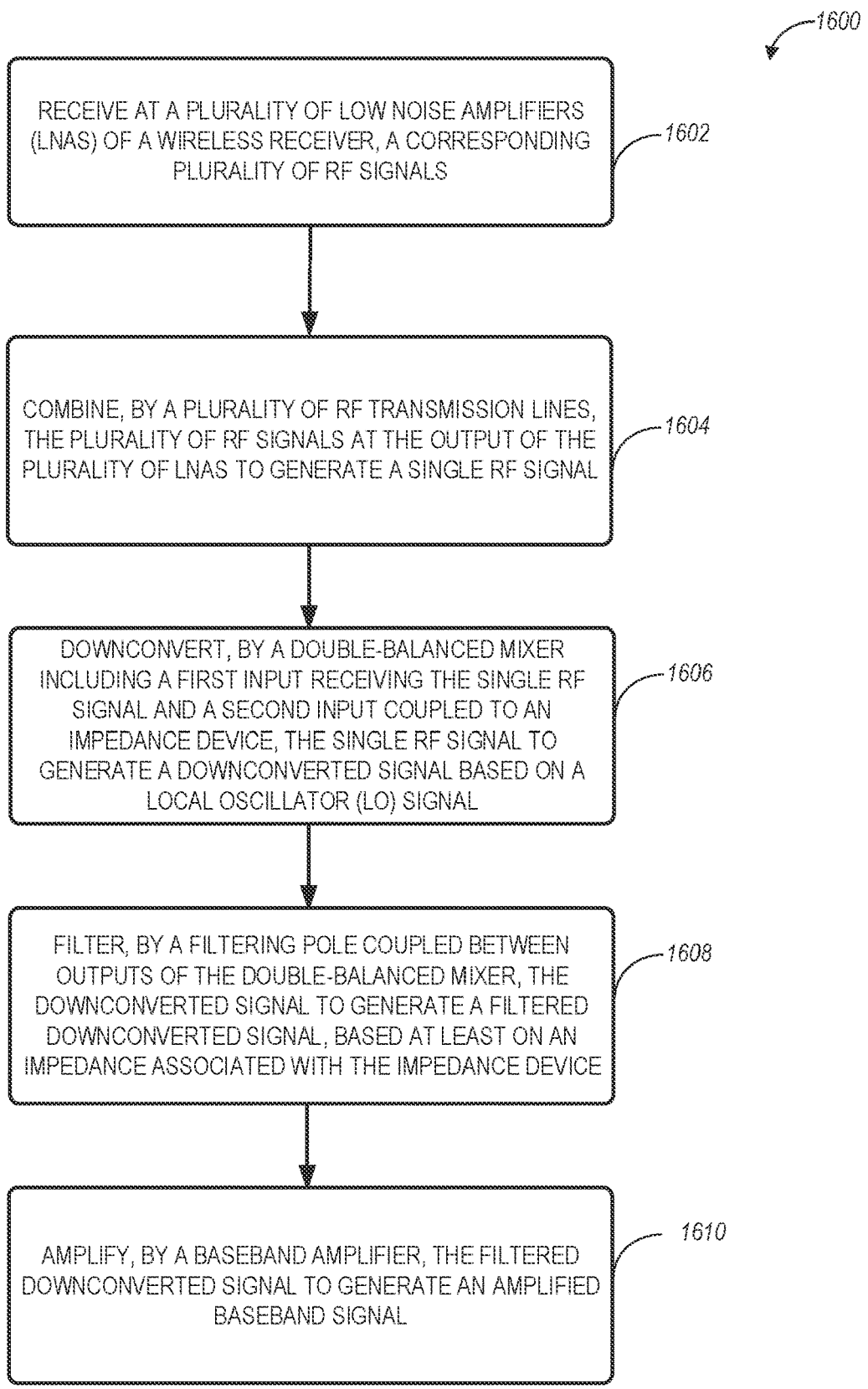
FIG. 16 illustrates a flow diagram of an example method for processing radio frequency (RF) signals, according to some aspects.

FIG. 16 illustrates a flow diagram of an example method 1600 for processing radio frequency MO signals, according to some aspects. Referring to FIG. 11 and FIG. 16, the example method 1600 for processing RF signals can start at operation 1602, when a corresponding plurality of RF signals are received at a plurality of low noise amplifiers (LNAs) of a wireless receiver. For example, RF input signals 1102 and 1104 received at LNAs 1106-1112 of RF circuitry 1103. At operation 1604, the plurality of RF signals at the output of the plurality of LNAs can be combined by a plurality of RF transmission lines, to generate a single RF signal. For example, the amplified RF signals at the outputs of LNAs 1110 and 1112 can be combined by the RF transmission line network 1114 to generate a single RF signal.

At operation 1606, the single RF signal can be downconverted by a double-balanced mixer to generate a downconverted signal based on a local oscillator (LO) signal. For example, the single RF signal at the output of the RF transmission line network 1114 is downconverted by the mixer 1116. The downconversion mixer 1116 includes a first input (e.g., 1132) receiving the single RF signal and a second input (e.g., 1133) coupled to an impedance device (e.g., 1119). At operation 1608, a filtering pole coupled between outputs of the double-balanced mixer can be used to filter the downconverted signal to generate a filtered downconverted signal, based at least on an impedance associated with the impedance device. For example, the filtering pole (POLE1) can include a capacitive component 1120 and impedance component 1119 at the second mixer input 1133. At operation 1610, the filtered downconverted signal can be amplified by a baseband amplifier to generate an amplified baseband signal.

Figure 17:
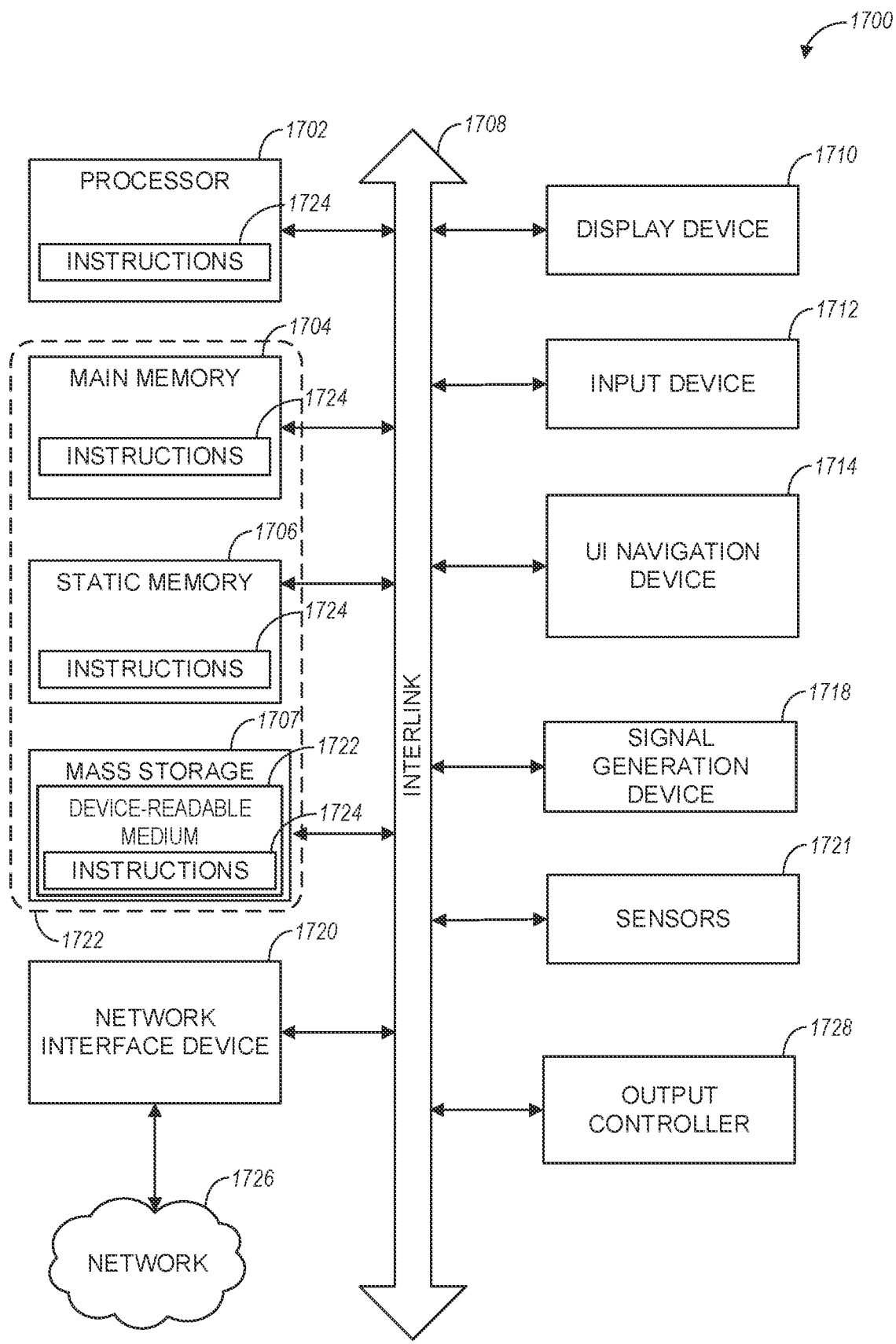
FIG. 17 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 17 illustrates a block diagram of a communication device 1700 such as an evolved Node-B (eNB), a new generation Node-B (gNB), an access point (AP), a wireless station (STA), a mobile station (MS), or a user equipment (UE), in accordance with some aspects. In alternative aspects, the communication device 1700 may operate as a standalone device or may be connected (e.g., networked) to other communication devices. In some aspects, the communication device 1700 can use one or more of the techniques and circuits discussed herein, in connection with any of FIG. 1-FIG. 16.

Circuitry (e.g., processing circuitry) is a collection of circuits implemented in tangible entities of the device 1700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1700 follow.

In some aspects, the device 1700 may operate as a standalone device or may be connected (e.g., networked) to other devices. In a networked deployment, the communication device 1700 may operate in the capacity of a server communication device, a client communication device, or both in server-client network environments. In an example, the communication device 1700 may act as a peer communication device in peer-to-peer (P2P) (or other distributed) network environment. The communication device 1700 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1700 may include a hardware processor 1702 (e.g., a central processing unit (CPU), a graphics processing unit (GPU), a hardware processor core, or any combination thereof), a main memory 1704, a static memory 1706, and mass storage 1716 (e.g., hard drive, tape drive, flash storage, or other block or storage devices), some or all of which may communicate with each other via an interlink (e.g., bus) 1708.

The communication device 1700 may further include a display unit 1710, an alphanumeric input device 1712 (e.g., a keyboard), and a user interface (UI) navigation device 1714 (e.g., a mouse). In an example, the display unit 1710, input device 1712, and UI navigation device 1714 may be a touch screen display. The communication device 1700 may additionally include a signal generation device 1718 (e.g., a speaker), a network interface device 1720, and one or more sensors 1721, such as a global positioning system (GPS) sensor, compass, accelerometer, or another sensor. The communication device 1700 may include an output controller 1728, such as a serial (e.g., universal serial bus (USB), parallel, or other wired or wireless e.g., infrared (IR), near field communication (NFC), etc.) connection to communicate or control one or more peripheral devices (e.g., a printer, card reader, etc.).

The storage device 1716 may include a communication device-readable medium 1722, on which is stored one or more sets of data structures or instructions 1724 (e.g., software) embodying or utilized by any one or more of the techniques or functions described herein. In some aspects, registers of the processor 1702, the main memory 1704, the static memory 1706, and/or the mass storage 1716 may be, or include (completely or at least partially), the device-readable medium 1722, on which is stored the one or more sets of data structures or instructions 1724, embodying or utilized by any one or more of the techniques or functions described herein. In an example, one or any combination of the hardware processor 1702, the main memory 1704, the static memory 1706, or the mass storage 1716 may constitute the device-readable medium 1722.

As used herein, the term "device-readable medium" is interchangeable with "computer-readable medium" or "machine-readable medium". While the communication device-readable medium 1722 is illustrated as a single medium, the term "communication device-readable medium" may include a single medium or multiple media (e.g., a centralized or distributed database, and/or associated caches and servers) configured to store the one or more instructions 1724.

The term "communication device-readable medium" may include any medium that is capable of storing, encoding, or carrying instructions for execution by the communication device 1700 and that cause the communication device 1700 to perform any one or more of the techniques of the present disclosure, or that is capable of storing, encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1724 may further be transmitted or received over a communications network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1720 may include one or more physical jacks (e.g., Ethernet, coaxial, or phone jacks) or one or more antennas to connect to the communications network 1726. In an example, the network interface device 1720 may include a plurality of antennas to wirelessly communicate using at least one of single-input multiple-output (SIMO), MIMO, or multiple-input single-output (MISO) techniques. In some examples, the network interface device 1720 may wirelessly communicate using Multiple User MIMO techniques.

The term "transmission medium" shall be taken to include any intangible medium that is capable of storing, encoding or carrying instructions for execution by the communication device 1700, and includes digital or analog communications signals or other intangible medium to facilitate communication of such software. In this regard, a transmission medium in the context of this disclosure is a device-readable medium.

Figure 18:
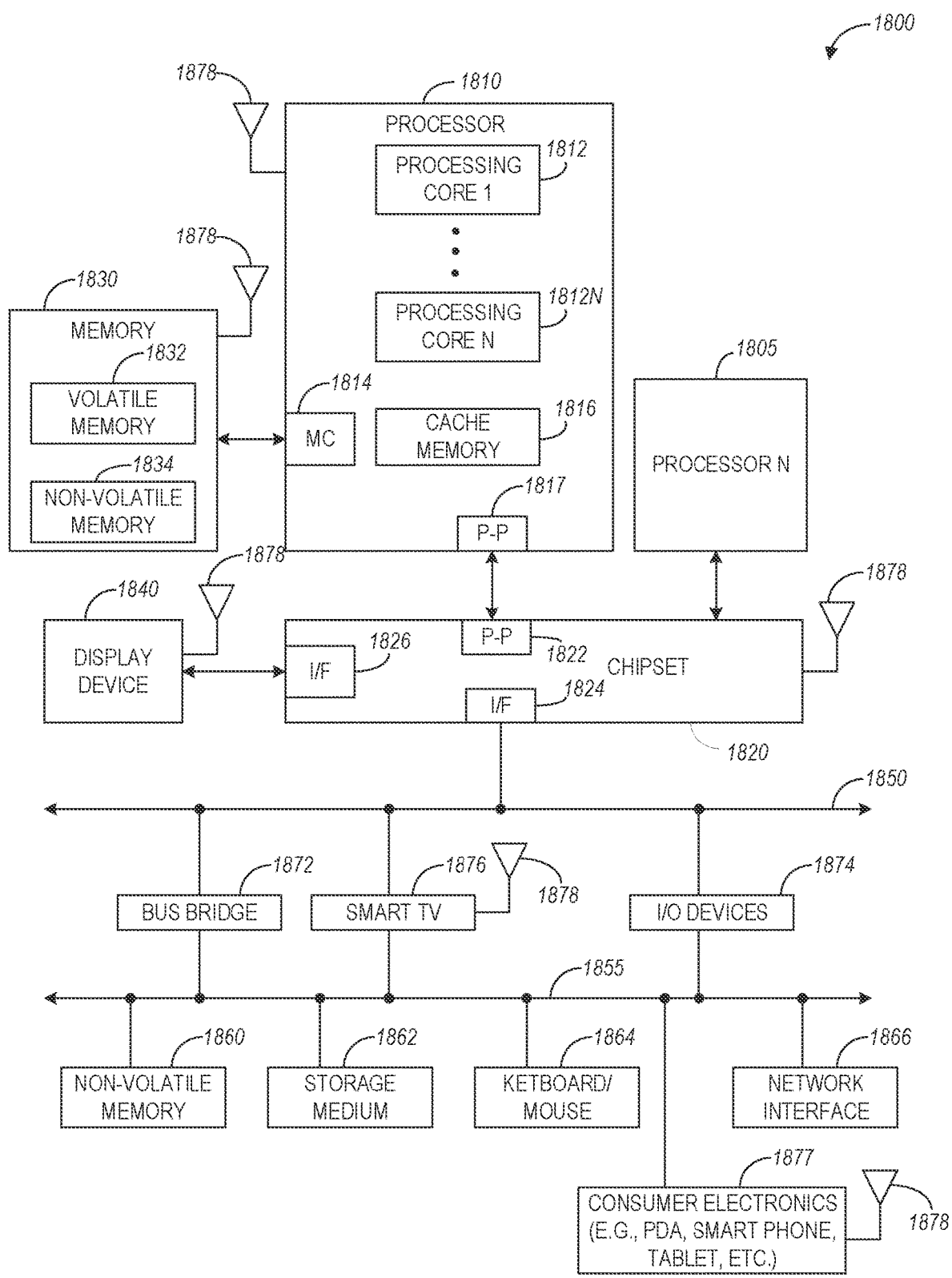
FIG. 18 illustrates a system level diagram, depicting an example of an electronic device (e.g., system) that can include, for example, a transmitter configured to selectively fan out a signal to one of multiple communication channels.

FIG. 18 illustrates a system level diagram, depicting an example of an electronic device (e.g., system) that can include, for example, a transmitter configured to selectively fan out a signal to one of multiple communication channels. FIG. 18 is included to show an example of a higher-level device application for the subject matter discussed above with regards to FIGS. 1-16. In one aspect, system 1800 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In some aspects, system 1800 is a system on a chip (SOC) system.

In one aspect, processor 1810 has one or more processor cores 1812, . . . , 1812N, where 1812N represents the Nth processor core inside processor 1810 where N is a positive integer. In one aspect, system 1800 includes multiple processors including 1810 and 1805, where processor 1805 has logic similar or identical to the logic of processor 1810. In some aspects, processing core 1812 includes, but is not limited to, pre-fetch logic to fetch instructions, decode logic to decode the instructions, execution logic to execute instructions and the like. In some aspects, processor 1810 has a cache memory 1816 to cache instructions and/or data for system 1800. Cache memory 1816 may be organized into a hierarchal structure including one or more levels of cache memory.

In some aspects, processor 1810 includes a memory controller 1814, which is operable to perform functions that enable the processor 1810 to access and communicate with memory 1830 that includes a volatile memory 1832 and/or a non-volatile memory 1834. In some aspects, processor 1810 is coupled with memory 1830 and chipset 1820. Processor 1810 may also be coupled to a wireless antenna 1878 to communicate with any device configured to transmit and/or receive wireless signals. In one aspect, an interface for wireless antenna 1878 operates in accordance with, but is not limited to, the IEEE 802.11 standard and its related family, Home Plug AV (HPAV), Ultra Wide Band (UWB), Bluetooth, WiMax, or any form of wireless communication protocol.

In some aspects, volatile memory 1832 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1834 includes, but is not limited to, flash memory, phase change memory (PCM), read-only memory (ROM), electrically erasable programmable read-only memory (EEPROM), or any other type of non-volatile memory device.

Memory 1830 stores information and instructions to be executed by processor 1810. In one aspect, memory 1830 may also store temporary variables or other intermediate information while processor 1810 is executing instructions. In the illustrated aspect, chipset 1820 connects with processor 1810 via Point-to-Point (PtP or P-P) interfaces 1817 and 1822. Chipset 1820 enables processor 1810 to connect to other elements in system 1800. In some aspects of the example system, interfaces 1817 and 1822 operate in accordance with a PtP communication protocol such as the Intel® QuickPath Interconnect (QPI) or the like. In other aspects, a different interconnect may be used.

In some aspects, chipset 1820 is operable to communicate with processor 1810, 1805N, display device 1840, and other devices, including a bus bridge 1872, a smart TV 1876, I/O devices 1874, nonvolatile memory 1860, a storage medium (such as one or more mass storage devices) 1862, a keyboard/mouse 1864, a network interface 1866, and various forms of consumer electronics 1877 (such as a PDA, smart phone, tablet etc.), etc. In one aspect, chipset 1820 couples with these devices through an interface 1824. Chipset 1820 may also be coupled to a wireless antenna 1878 to communicate with any device configured to transmit and/or receive wireless signals.

Chipset 1820 connects to display device 1840 via interface 1826. Display 1840 may be, for example, a liquid crystal display (LCD), a plasma display, cathode ray tube (CRT) display, or any other form of visual display device. In some aspects of the example system, processor 1810 and chipset 1820 are merged into a single SOC. In addition, chipset 1820 connects to one or more buses 1850 and 1855 that interconnect various system elements, such as I/O devices 1874, nonvolatile memory 1860, storage medium 1862, a keyboard/mouse 1864, and network interface 1866. Buses 1850 and 1855 may be interconnected together via a bus bridge 1872.

In one aspect, mass storage device 1862 includes, but is not limited to, a solid-state drive, a hard disk drive, a universal serial bus flash memory drive, or any other form of computer data storage medium. In one aspect, network interface 1866 is implemented by any type of well-known network interface standard including, but not limited to, an Ethernet interface, a universal serial bus (USB) interface, a Peripheral Component interconnect (PCI) Express interface, a wireless interface and/or any other suitable type of interface. In one aspect, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 18 are depicted as separate blocks within the system 1800, the functions performed by some of these blocks may be integrated within a single semiconductor circuit or may be implemented using two or more separate integrated circuits. For example, although cache memory 1816 is depicted as a separate block within processor 1810, cache memory 1816 (or selected aspects of 1816) can be incorporated into processor core 1812.

Additional Notes and Aspects

Example 1 is a wireless communication device, comprising: an antenna array configured to receive a plurality of radio frequency (RF) signals; RF circuitry configured to process the plurality of RF signals received via the antenna array to generate a single RF signal; and digital baseband receive circuitry coupled to the RF circuitry and configured to: generate a downconverted signal based on the single RF signal; amplify the downconverted signal to generate an amplified downconverted signal; and convert the amplified downconverted signal to generate a digital output signal for processing by a wireless modem, wherein the digital baseband receive circuitry further comprises at least a first filtering system configured to filter the downconverted signal prior to amplification.

In Example 2, the subject matter of Example 1 includes, wherein the digital baseband receive circuitry comprises: a downconversion mixer configured to receive the single RF signal via a first mixer input and generate the downconverted signal based on a local oscillator (LO) signal.

In Example 3, the subject matter of Example 2 includes, wherein the first filtering system is configured to perform translational filtering of the single RF signal, the translational filtering based on a frequency of the LO signal.

In Example 4, the subject matter of Examples 2-3 includes, wherein the at least first filtering system comprises: a variable capacitor electrically coupled to outputs of the downconversion mixer; and an impedance device electrically coupled to a second mixer input of the downconversion mixer.

In Example 5, the subject matter of Example 4 includes, wherein the impedance device comprises a variable resistor.

In Example 6, the subject matter of Examples 4-5 includes, wherein the digital baseband receive circuitry further comprises: an amplifier configured to generate the amplified downconverted signal; and at least a second filtering system electrically coupled to an output of the amplifier, the first and second filtering systems configured to filter out-of-band signals.

In Example 7, the subject matter of Example 6 includes, wherein the amplifier is a transconductance amplifier.

In Example 8, the subject matter of Examples 6-7 includes, a digital control circuit configured to receive the digital output signal and configure at least one filtering characteristic of the first and second filtering systems based on the digital output signal.

In Example 9, the subject matter of Example 8 includes, wherein the digital control circuit is configured to generate filter trim to adjust variable capacitance associated with the first and second filtering systems.

In Example 10, the subject matter of Examples 6-9 includes, wherein the digital baseband receive circuitry further comprises: an analog-to-digital converter (ADC) electrically coupled to the second filtering system and configured to convert a filtered representation of the amplified downconverted signal to generate the digital output signal for processing by the wireless modem.

In Example 11, the subject matter of Examples 2-10 includes, wherein the RF circuitry comprises: a plurality of low noise amplifiers (LNAs), each of the plurality of LNAs configured to receive one of the plurality of RF signals; and one or more RF transmission lines (T-lines) electrically coupled to the plurality of LNAs and configured to combine one or more of the plurality of RF signals to generate the single RF signal.

In Example 12, the subject matter of Example 11 includes, wherein the downconversion mixer is configured to receive the single RF signal via a single RF T-line of the one or more RF T-lines.

In Example 13, the subject matter of Example 12 includes, wherein the single RF T-line is alternating current (AC) coupled to the first mixer input of the downconversion mixer.

Example 14 is a method for processing radio frequency (RF) signals, the method comprising: receiving at a plurality of low noise amplifiers (LNAs) of a wireless receiver, a corresponding plurality of RF signals; combining, by a plurality of RF transmission lines, the plurality of RF signals at the output of the plurality of LNAs to generate a single RF signal; downconverting, by a double-balanced mixer including a first input receiving the single RF signal and a second input coupled to an impedance device, the single RF signal to generate a downconverted signal based on a local oscillator (LO) signal; filtering, by a filtering pole coupled between outputs of the double-balanced mixer, the downconverted signal to generate a filtered downconverted signal, based at least on an impedance associated with the impedance device; and amplifying, by a baseband amplifier, the filtered downconverted signal to generate an amplified baseband signal.

In Example 15, the subject matter of Example 14 includes, wherein the filtering is further based on a capacitance of a variable capacitor of the filtering pole.

In Example 16, the subject matter of Examples 14-15 includes, filtering, by a second filtering pole coupled between outputs of the baseband amplifier the amplified baseband signal to generate a filtered amplified signal.

In Example 17, the subject matter of Example 16 includes, converting, by an analog-to-digital converter (ADC), the filtered amplified signal to a digital signal for processing by a wireless modem.

In Example 18, the subject matter of Example 17 includes, adjusting one or more filtering characteristics of the filtering pole and the second filtering pole based on the digital signal.

In Example 19, the subject matter of Examples 14-18 includes, amplifying at least one of the plurality of RF signals by an LNA of the plurality of LNAs to generate an amplified RF signal, wherein the amplified RF signal is output via an output impedance compensation path of the LNA.

Example 20 is a wireless device for multiple-input-multiple-output (MEM) communications, comprising: an antenna array; and a plurality of baseband communication paths configured to receive a corresponding plurality of radio frequency (RF) signals via the antenna array, wherein each of the baseband communication paths comprises: RF circuitry configured to process a subset of the plurality of RF signals received via the antenna array to generate a single RF signal; a downconversion mixer configured to generate a downconverted signal based on the single RF signal and a local oscillator (LO) signal; a first filtering system configured to filter the downconverted signal and generate a filtered baseband signal; an amplifier circuit configured to amplify the filtered baseband signal to generate an amplified signal; and an analog-to-digital converter (ADC) configured to convert the amplified signal to a digital output signal for processing by a wireless modem, wherein at least a first baseband communication path of the plurality of baseband communication paths receives a main RF signal, at least a second baseband communication path of the plurality of baseband communication paths receives a diversity RF signal corresponding to the main RF signal, and the first and second communication paths share a common phased locked loop (PLL) generating the LO signal.

In Example 21, the subject matter of Example 20 includes, wherein each of the baseband communication paths further comprises: a second filtering system configured to filter the amplified signal prior to conversion by the ADC.

In Example 22, the subject matter of Example 21 includes, wherein the second filtering system includes a variable capacitor coupled between differential outputs of the amplifier circuit.

In Example 23, the subject matter of Examples 20-22 includes, wherein the first filtering system is configured to perform translational filtering of the single RF signal, the translational filtering based on a frequency of the LO signal.

In Example 24, the subject matter of Examples 20-23 includes, wherein the downconversion mixer includes a first mixer input receiving the single RF signals and a second mixer input coupled to a dummy load.

In Example 25, the subject matter of Example 24 includes, wherein first filtering system comprises: a variable capacitor electrically coupled to differential outputs of the downconversion mixer; and an impedance device electrically coupled to the second mixer input of the downconversion mixer.

In Example 26, the subject matter of Examples 20-25 includes, wherein the RF circuitry further comprises: a plurality of low noise amplifiers (LNAs), each of the plurality of LNAs configured to receive one of the subset of RF signals; and one or more RF transmission lines (T-lines) electrically coupled to the plurality of LNAs and configured to combine the subset of RF signals to generate the single RF signal.

In Example 27, the subject matter of Examples 20-26 includes, wherein the plurality of RF signals comprises: a first subset of the plurality of RF signals forming main RF signals, the main RF signals received via at least a first antenna of the antenna array; and a second subset of the plurality of RF signals forming diversity RF signals corresponding to the main RF signals, the diversity RF signals received via at least a second antenna of the antenna array, wherein the at least first and second antennas are configured for 2×2 MIMO operation.

In Example 28, the subject matter of Example 27 includes, wherein: a first baseband communication path of the plurality of baseband communication paths receives a first main RF signal of the first subset of the plurality of RF signals; a second baseband communication path of the plurality of baseband communication paths receives a first diversity RF signal of the second subset of the plurality of RF signals; a third baseband communication path of the plurality of baseband communication paths receives a second main RF signal of the first subset of the plurality of RF signals; and a fourth baseband communication path of the plurality of baseband communication paths receives a second diversity RF signal of the second subset of the plurality of RF signals.

In Example 29, the subject matter of Example 28 includes, wherein the antenna array further includes: at least a third antenna configured to receive a main MIMO RF input signal corresponding to the first main RF signal; and at least a fourth antenna configured to receive a diversity MIMO RF input signal corresponding to the first diversity RF signal, the at least first, second, third, and fourth antenna of the antenna array configured for 4×4 MIMO operation.

In Example 30, the subject matter of Example 29 includes, wherein during the 4×4 MIMO operation: the third baseband communication path of the plurality of baseband communication paths receives the main MIMO RF input signal for processing; the fourth baseband communication path of the plurality of baseband communication paths receives the diversity MIMO RF input signal for processing; and the common PLL associated with the first and second baseband communication paths is further shared with the third and fourth baseband communication paths receiving the main and diversity MIMO input signals.

In Example 31, the subject matter of Example 30 includes, a first divider coupled to the common PLL and configured to generate the LO signal for the downconversion mixers in the first and second baseband communication paths; and a second divider coupled to the common PLL and configured to generate a second LO signal for use during the 4×4 MIMO operation.

In Example 32, the subject matter of Example 31 includes, a first MIMO downconversion mixer configured to receive the second. LO signal and downconvert the main MIMO RF input signal using the third baseband communication path; and a second MIMO downconversion mixer configured to receive the second LO signal and downconvert the diversity MIMO RF input signal using the fourth baseband communication path.

In Example 33, the subject matter of Example 32 includes, wherein the first and second MIMO downconversion mixers are separate from downconversion mixers within the third and fourth baseband communication path used for processing the second main RF signal and the second diversity RF signal.

In Example 34, the subject matter of Examples 20-33 includes, wherein during 4×4 MIMO operation, at least four of the plurality of baseband communication paths are configured to: receive a subset of the plurality of RF signals via a plurality of MIMO antennas within the antenna array; and downconvert the subset of the RF signals using the downconversion mixer in each of the baseband communication paths and using local oscillator signals generated by the common PLL.

In Example 35, the subject matter of Examples 26-34 includes, wherein each of the plurality of LNAs comprises: a first plurality of transistors forming an amplification path, the amplification path including one or more automatic gain control (AGC) inputs and an output signal port.

In Example 36, the subject matter of Example 35 includes, wherein each of the plurality of LNAs further comprises: a second plurality of transistors forming an output impedance compensation path, the output impedance compensation path coupled to the output signal port and configured to provide constant impedance at the output signal port.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

What is claimed is:

1. A wireless communication device, comprising:
an antenna array configured to receive a plurality of radio frequency (RF) signals;
RF circuitry configured to amplify and combine the plurality of RF signals received via the antenna array to generate a single RF signal; and
digital baseband receive circuitry coupled to the RF circuitry and configured to:
generate a downconverted signal based on the single RF signal and a plurality of impedance values;
amplify the downconverted signal to generate an amplified downconverted signal; and
convert the amplified downconverted signal to generate a digital output signal for processing by a wireless modem,
wherein the digital baseband receive circuitry comprises at least one filtering system with a filtering pole, the filtering system configured to filter the downconverted signal using a variable capacitor of the filtering pole, prior to amplification, a frequency response of the filtering pole based on the plurality of impedance values.

2. The wireless communication device of claim 1, wherein the digital baseband receive circuitry further comprises:
a downconversion mixer configured to receive the single RF signal via a first mixer input and generate the downconverted signal based on a local oscillator (LO) signal, the filtering pole coupled between outputs of the downconversion mixer.

3. The wireless communication device of claim 2, wherein the at least one filtering system is configured to perform translational filtering of the single RF signal, the translational filtering based on a frequency of the LO signal.

4. The wireless communication device of claim 2, wherein the RF circuitry comprises:
a plurality of low noise amplifiers (LNAs), each of the plurality of LNAs configured to receive one of the plurality of RF signals; and
one or more RF transmission lines (T-lines) electrically coupled to the plurality of LNAs and configured to combine one or more of the plurality of RF signals to generate the single RF signal.

5. The wireless communication device of claim 4, wherein the downconversion mixer is configured to receive the single RF signal via a single RF T-line of the one or more RF T-lines.

6. The wireless communication device of claim 5, wherein the single RF T-line is alternating current (AC) coupled to the first mixer input of the downconversion mixer.

7. A wireless communication device, comprising:
an antenna array configured to receive a plurality of radio frequency (RF) signals;
RF circuitry configured to process the plurality of RF signals received via the antenna array to generate a single RF signal; and
digital baseband receive circuitry coupled to the RF circuitry and configured to:
receive the single RF signal via a first mixer input of a downconversion mixer and generate a downconverted signal based on a local oscillator (LO) signal;
amplify the downconverted signal to generate an amplified downconverted signal; and
convert the amplified downconverted signal to generate a digital output signal for processing by a wireless modem,
wherein the digital baseband receive circuitry comprises at least a first filtering system configured to filter the downconverted signal prior to amplification, and
wherein the at least first filtering system comprises:
a variable capacitor electrically coupled to outputs of the downconversion mixer; and
an impedance device electrically coupled to a second mixer input of the downconversion mixer.

8. The wireless communication device of claim 7, wherein the impedance device comprises a variable resistor.

9. The wireless communication device of claim 7, wherein the digital baseband receive circuitry further comprises:
an amplifier configured to generate the amplified downconverted signal; and
at least a second filtering system electrically coupled to an output of the amplifier, the first and second filtering systems configured to filter out-of-band signals.

10. The wireless communication device of claim 9, wherein the amplifier is a transconductance amplifier.

11. The wireless communication device of claim 9, wherein the digital baseband receive circuitry further comprises:
a digital control circuit configured to receive the digital output signal and configure at least one filtering characteristic of the first and second filtering systems based on the digital output signal.

12. The wireless communication device of claim 11, wherein the digital control circuit is configured to generate filter trim to adjust variable capacitance associated with the first and second filtering systems.

13. The wireless communication device of claim 9, wherein the digital baseband receive circuitry further comprises:
an analog-to-digital converter (ADC) electrically coupled to the second filtering system and configured to convert a filtered representation of the amplified downconverted signal to generate the digital output signal for processing by the wireless modem.

14. A method for processing radio frequency (RF) signals, the method comprising:
receiving at a plurality of low noise amplifiers (LNAs) of a wireless receiver, a corresponding plurality of RF signals;
combining, by a plurality of RF transmission lines, the plurality of RF signals at an output of the plurality of LNAs to generate a single RF signal;
downconverting, by a double-balanced mixer including a first input receiving the single RF signal and a second input coupled to an impedance device, the single RF signal to generate a downconverted signal based on a local oscillator (LO) signal;
filtering, by a filtering pole coupled between outputs of the double-balanced mixer, the downconverted signal to generate a filtered downconverted signal, based at least on an impedance associated with the impedance device; and
amplifying, by a baseband amplifier, the filtered downconverted signal to generate an amplified baseband signal.

15. The method according to claim 14, wherein the filtering is further based on a capacitance of a variable capacitor of the filtering pole.

16. The method according to claim 14, further comprising:
filtering the amplified baseband signal using a second filtering pole coupled between outputs of the baseband amplifier, to generate a filtered amplified signal.

17. The method of claim 16, further comprising:
converting, by an analog-to-digital converter (ADC), the filtered amplified signal to a digital signal for processing by a wireless modem.

18. The method according to claim 17, further comprising:
adjusting one or more filtering characteristics of the filtering pole and the second filtering pole based on the digital signal.

19. The method according to claim 14, further comprising:
amplifying at least one of the plurality of RF signals by an LNA of the plurality of LNAs to generate an amplified RF signal, wherein the amplified RF signal is output via an output impedance compensation path of the LNA.

20. A wireless device for multiple-input-multiple-output (MIMO) communications, comprising:
   an antenna array; and
   a plurality of baseband communication paths configured to receive a corresponding plurality of radio frequency (RF) signals via the antenna array, wherein each of the baseband communication paths comprises:
      RF circuitry configured to amplify and combine a subset of the plurality of RF signals received via the antenna array to generate a single RF signal;
      a downconversion mixer configured to generate a downconverted signal based on the single RF signal, a plurality of impedance values, and a local oscillator (LO) signal;
      a first filtering system with a filtering pole, the filtering system configured to filter the downconverted signal using a first variable capacitor of the filtering pole and generate a filtered baseband signal, the filtering pole coupled between outputs of the downconversion mixer, and a frequency response of the filtering pole is based on the plurality of impedance values;
      an amplifier circuit configured to amplify the filtered baseband signal to generate an amplified signal; and
      an analog-to-digital converter (ADC) configured to convert the amplified signal to a digital output signal for processing by a wireless modem,
   wherein at least a first baseband communication path of the plurality of baseband communication paths receives a main RF signal, at least a second baseband communication path of the plurality of baseband communication paths receives a diversity RF signal corresponding to the main RF signal, and the first baseband communication path and the second baseband communication path share a common phased locked loop (PLL) generating the LO signal.

21. The wireless device of claim 20, wherein each of the baseband communication paths further comprises:
   a second filtering system configured to filter the amplified signal prior to conversion by the ADC.

22. The wireless device of claim 21, wherein the second filtering system includes a second variable capacitor coupled between differential outputs of the amplifier circuit.

23. The wireless device of claim 21, wherein the first filtering system is configured to perform translational filtering of the single RF signal, the translational filtering based on a frequency of the LO signal.

24. The wireless device of claim 20, wherein the downconversion mixer includes a first mixer input receiving the single RF signal and a second mixer input coupled to a dummy load.

* * * * *